United States Patent
Segev et al.

(10) Patent No.: US 10,374,778 B2
(45) Date of Patent: Aug. 6, 2019

(54) APPARATUS, SYSTEM AND METHOD OF MULTI USER RESOURCE ALLOCATION

(71) Applicant: INTEL IP CORPORATION, Santa Clara, CA (US)

(72) Inventors: Jonathan Segev, Tel Mond (IL); Laurent Cariou, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 61 days.

(21) Appl. No.: 15/393,329

(22) Filed: Dec. 29, 2016

(65) Prior Publication Data

US 2018/0027561 A1    Jan. 25, 2018

Related U.S. Application Data

(60) Provisional application No. 62/364,419, filed on Jul. 20, 2016.

(51) Int. Cl.
| | |
|---|---|
| *H04L 5/00* | (2006.01) |
| *H04L 1/00* | (2006.01) |
| *H04W 74/06* | (2009.01) |

(52) U.S. Cl.
CPC .............. *H04L 5/0055* (2013.01); *H04L 1/00* (2013.01); *H04L 5/0069* (2013.01);
(Continued)

(58) Field of Classification Search
CPC ........... H04W 72/0446; H04W 72/042; H04W 72/0413; H04W 72/0453; H04W 72/1289;
(Continued)

(56) References Cited

U.S. PATENT DOCUMENTS

| | | |
|---|---|---|
| 2006/0111129 A1 | 5/2006 | Ihm et al. |
| 2008/0146242 A1 | 6/2008 | Alanara et al. |

(Continued)

FOREIGN PATENT DOCUMENTS

| | | | |
|---|---|---|---|
| WO | 2010024550 | 3/2010 | |
| WO | WO 2015/038176 | * 3/2015 | ............ H04W 56/00 |

OTHER PUBLICATIONS

International Search Report and Written Opinion for PCT/US2017/038255, dated Sep. 22, 2017, 13 pages.

(Continued)

*Primary Examiner* — Ricardo H Castaneyra
(74) *Attorney, Agent, or Firm* — Shichrur & Co.

(57) ABSTRACT

Some demonstrative embodiments include apparatuses, systems and/or methods of Multi User (MU) resource allocation. For example, an apparatus may include circuitry and logic configured to cause a wireless station to transmit a short feedback trigger frame including a first allocation of opportunities for short feedback from associated stations, and a second allocation of opportunities for short feedback from unassociated stations; to process a plurality of short feedbacks from a plurality of stations according to the first and second allocations, the plurality of short feedbacks to indicate uplink resource requests; based on the plurality of short feedbacks, to transmit a MU trigger frame to allocate uplink resources to the plurality of stations; and to process uplink transmissions from the plurality of stations according to the uplink resources.

25 Claims, 11 Drawing Sheets

(52) U.S. Cl.
CPC ........... *H04L 5/0091* (2013.01); *H04W 74/06* (2013.01); *H04L 5/008* (2013.01); *H04L 5/0023* (2013.01)

(58) Field of Classification Search
CPC ............. H04W 72/04; H04W 72/0406; H04W 72/044; H04W 72/121; H04W 72/048; H04W 74/006; H04W 24/10; H04W 28/06; H04W 52/0209; H04W 76/10; H04W 4/02; H04W 8/005; H04W 74/06; H04W 64/00; H04W 52/0216; H04L 5/0055; H04L 5/008; H04L 5/0023; H04L 5/0069; H04L 5/0091; H04L 1/00
See application file for complete search history.

(56) References Cited

U.S. PATENT DOCUMENTS

2013/0229996 A1* 9/2013 Wang ................ H04W 72/0413 370/329
2015/0043433 A1 2/2015 Ren
2016/0066342 A1 3/2016 Ma et al.
2017/0289994 A1* 10/2017 Kim .................. H04W 72/0413

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
IEEE Std 802.11ac™—2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.
International Preliminary Report on Patentability for International Application No. PCT/US2017/038255, dated Jan. 31, 2019, 10 pages.

\* cited by examiner

APPARATUS, SYSTEM AND METHOD OF MULTI USER RESOURCE ALLOCATION

CROSS REFERENCE

This Application claims the benefit of and priority from U.S. Provisional Patent Application No. 62/364,419 entitled "APPARATUS, SYSTEM AND METHOD OF SHORT FEEDBACK RESOURCE ALLOCATION", filed Jul. 20, 2016, the entire disclosure of which is incorporated herein by reference.

TECHNICAL FIELD

Embodiments described herein generally relate to multi user resource allocation.

BACKGROUND

Some wireless communication systems may communicate according to a multi-user (MU) communication scheme, in which a wireless communication device, e.g., an Access point (AP), may communicate MU transmissions with a group of wireless communication devices, e.g., wireless stations.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
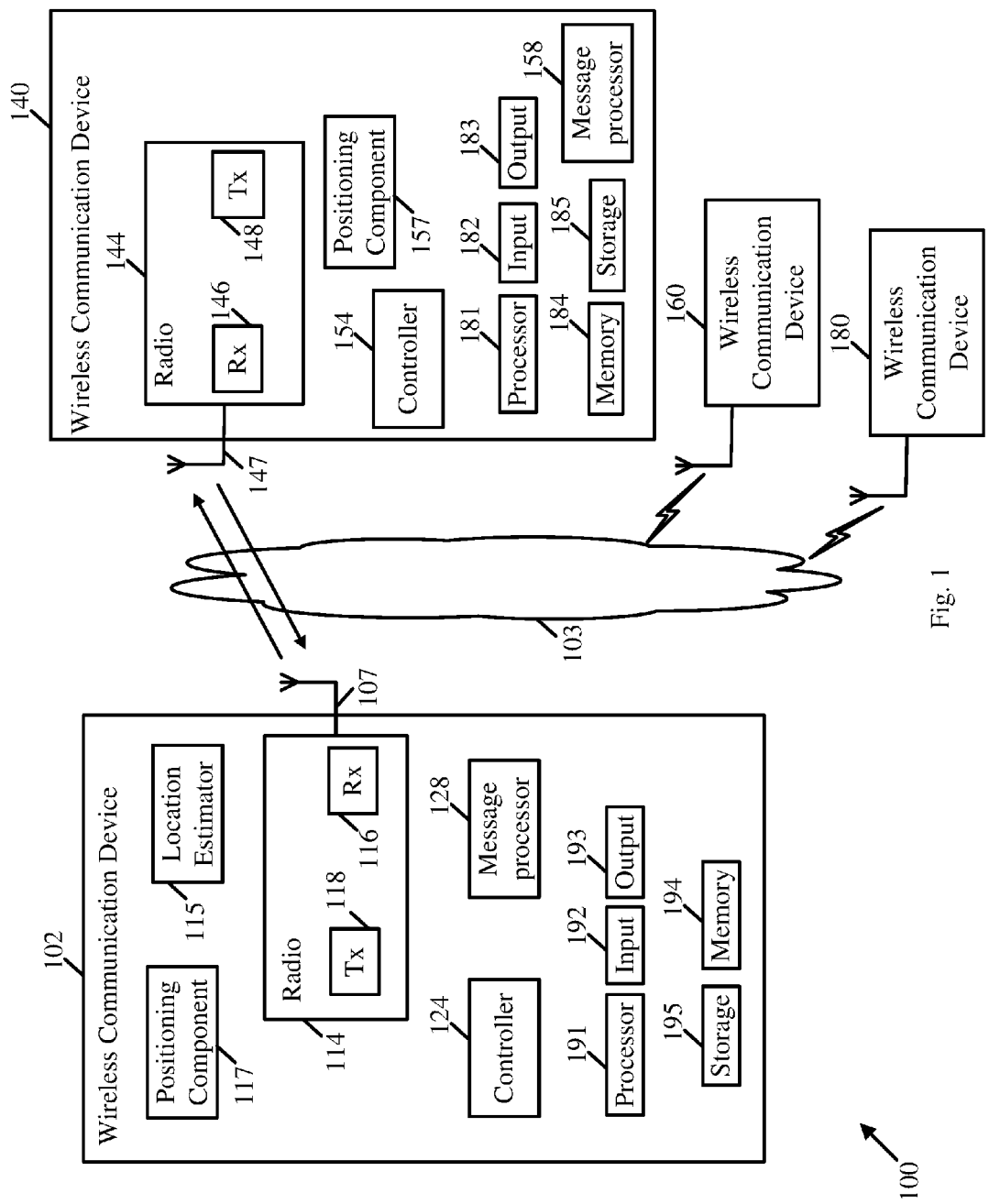
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including *IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; *IEEE*802.11*ac*-2013 ("*IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz*", December, 2013); *IEEE* 802.11*ad* ("*IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band"*, 28 Dec. 2012); *IEEE-*802.11*REVmc* ("*IEEE 802.11-REVmc™/D6.0*, June 2016, *draft standard for Information technology—Telecommunications and information exchange between systems Local and metropolitan area networks Specific requirements; Part 11: Wireless LAN Medium Access Control (MAC) and Physical Layer (PHY) Specification*"); IEEE 802.11ax (*IEEE 802.11ax, High Efficiency WLAN (HEW)*); and/or IEEE 802.11az (*IEEE 802.11az, Next Generation Positioning*)) and/or future versions and/or derivatives thereof, devices and/or networks operating in accordance with existing WiFi Alliance (WFA) Specifications (including *Wi-Fi Neighbor Awareness Networking (NAN) Technical Specification, Version 1.0*, May 1, 2015) and/or future versions and/or derivatives thereof, devices and/or networks operating in accordance with existing WFA Peer-to-Peer (P2P) specifications (including *WiFi P2P technical specification, version 1.5*, Aug. 4, 2014) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version 1.1*, April 2011, *Final specification*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102, 140, 160 and/or 180.

In some demonstrative embodiments, wireless communication devices 102, 140, 160 and/or 180 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102, 140, 160 and/or 180 may include, operate as, and/or perform the functionality of one or more STAs. For example, device 102 may include at least one STA, and/or device 140 may include at least one STA.

In some demonstrative embodiments, devices 102, 140, 160 and/or 180 may include, operate as, and/or perform the functionality of one or more WLAN STAs.

In some demonstrative embodiments, devices 102, 140, 160 and/or 180 may include, operate as, and/or perform the functionality of one or more Wi-Fi STAs.

In some demonstrative embodiments, devices 102, 140, 160 and/or 180 may include, operate as, and/or perform the functionality of one or more BT devices.

In some demonstrative embodiments, devices 102, 140, 160 and/or 180 may include, operate as, and/or perform the functionality of one or more Neighbor Awareness Networking (NAN) STAs.

In some demonstrative embodiments, one of wireless communication devices 102, 140, 160 and/or 180, e.g., device 140, may include, operate as, and/or perform the functionality of an AP STA, and/or one or more of wireless communication devices 102, 140, 160 and/or 180, e.g., device 102, 160 and/or 180, may include, operate as, and/or perform the functionality of a non-AP STA. In other embodiments, devices 102, 140, 160 and/or 180 may operate as and/or perform the functionality of any other STA.

For example, the AP may include a router, a PC, a server, a Hot-Spot and/or the like.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102, 140, 160 and/or 180 may optionally include other suitable hardware components and/or software components. In some demonstrative embodiments, some or all of the components of one or more of devices 102, 140, 160 and/or 180 may be enclosed in a common housing or packaging, and may be interconnected or operably associated using one or more wired or wireless links. In other embodiments, components of one or more of devices 102, 140, 160 and/or 180 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102, 140, 160 and/or 180 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a WiFi channel, an IR channel, a Bluetooth (BT) channel, and the like.

In some demonstrative embodiments, wireless communication medium 103 may include a wireless communication channel over a 2.4 Gigahertz (GHz) frequency band, or a 5 GHz frequency band, a millimeterWave (mmWave) frequency band, e.g., a 60 GHz frequency band, a S1G band, and/or any other frequency band.

In some demonstrative embodiments, devices 102, 140, 160 and/or 180 may include one or more radios including circuitry and/or logic to perform wireless communication between devices 102, 140, 160, 180 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a 2.4 GHz band, a 5 GHz band, an mmWave band, a S1G band, and/or any other band.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 160, 180 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140, 160, 180 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, at least part of the functionality of controller 124 may be implemented as part of one or more elements of radio 114, and/or at least part of the functionality of controller 154 may be implemented as part of one or more elements of radio 144.

In other embodiments, the functionality of controller 124 may be implemented as part of any other element of device 102, and/or the functionality of controller 154 may be implemented as part of any other element of device 140.

In some demonstrative embodiments, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or more messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102, device 140, device 160 and/or device 180 may include, operate as, perform the role of, and/or perform one or more functionalities of, one or more STAs. For example, device 102 may include at least one STA, device 140 may include at least one STA, device 160 may include at least one STA, and/or device 180 may include at least one STA.

In some demonstrative embodiments, wireless communication devices 102, 140, 160, and/or 180 may form, or may communicate as part of, a wireless local area network (WLAN).

In some demonstrative embodiments, wireless communication devices 102, 140, 160, and/or 180 may form, or may communicate as part of, a WiFi network.

In other embodiments, wireless communication devices 102, 140, 160, and/or 180 may form, and/or communicate as part of, any other additional or alternative network.

In some implementations or use cases, a scheduling mechanism, for example, in accordance with a High Efficiency (HE) Multi User (HE-MU) mode, e.g., in accordance with a future *IEEE 802.11ax Specification*, may enhance an effect where access to a wireless channel using a legacy Carrier Sense Multiple Access with Collision Avoidance (CSMA/CA) mechanism may have a lower probability. This probability may be even lower, for example, as the wireless medium becomes more congested.

In some demonstrative embodiments, there may be a problem to utilize a resource allocation in the HE-MU mode for some use cases, implementations, and/or scenarios. For example, resource allocation in the HE-MU mode may require one or more capabilities or operations, for example, a capability to exchange, and/or an opportunity to make a request for, resources, e.g., a downlink (DL) and/or an uplink (U) resources, which some stations, e.g., STAs in an unassociated mode, may not have.

In some demonstrative embodiments, devices 102, 160, 180 and/or 140 may be configured to implement a short feedback mechanism for resource allocations, which may allow, for example, resource allocation, for example, even for one or more STAs in an unassociated mode, e.g., as described below.

In some demonstrative embodiments, devices 102, 160, 180 and/or 140 may be configured to implement the short feedback mechanism for resource allocations, for example, to allow associated STAs to make use of a Short Feedback allocation in one or more first opportunities, and/or to allow unassociated STAs to make use of a short feedback allocation in one or more second opportunities, e.g., as described below.

In some demonstrative embodiments, the short feedback mechanism may be configured to allow an AP STA, e.g., device 140, to trigger very short responses, for example, even from a very large number of STAs, e.g., including devices 102, 160 and/or 180. For example, the AP may transit a trigger, e.g., in the form of, or as part of, a Trigger Frame (TF), which may allocate one or more allocations ("response allocations") for responding to the trigger, e.g., as described below.

In some demonstrative embodiments, a STA, for example, a STA of devices 102, 160, 180 and/or 140, e.g., device 102, may be configured to respond to the trigger from the AP, for example, in an Uplink (UL) MU mode, for example, by transmitting only a Physical Layer (PHY) preamble, e.g., with no data payload, using an orthogonal allocation, which may be designed, for example, in an HE Legacy Training Field (HE-LTF) in the PHY preamble, e.g., as described below.

In some demonstrative embodiments, the AP may be configured to detect responses from one or more STAs, for example, by performing energy or sequence detection on each of the response allocations, for example, to identify which STA has sent the feedback, e.g., according to an Allocation identifier (ID), and/or what is the feedback, e.g., an energy and/or a sequence detection, e.g., as described below.

In some demonstrative embodiments, the AP may be configured to use the trigger, for example, to "ask" the STAs to indicate which STAs would like to transmit, e.g., a resource request, and the STAs may respond, e.g., yes or no, for example using the short feedback, e.g., as described below.

In some demonstrative embodiments, device 140 may be configured to allocate resources to a plurality of stations, e.g., including response allocations for associated stations and/or unassociated stations, e.g., as described below.

In one example, device 140 may be configured to allocate the response allocations to be used by devices 102, 160 and/or 180, which may include associated stations and/or unassociated stations.

In some demonstrative embodiments, device 140 may be configured to transmit a short feedback trigger frame to allocate the response allocations to the associated and/or unassociated stations, e.g., as described below.

In some demonstrative embodiments, controller 154 may be configured to control, cause, and/or trigger device 140 to transmit a short feedback trigger frame including a first allocation of opportunities for short feedback from associated stations, and a second allocation of opportunities for short feedback from unassociated stations, e.g., as described below.

In some demonstrative embodiments, the first allocation of opportunities may include an allocation of non-contention-based opportunities, for example, to be allocated for one or more associated stations, e.g., as described below.

In some demonstrative embodiments, the second allocation of opportunities may include an allocation of contention-based opportunities, for example, to be allocated for one or more unassociated stations, e.g., as described below.

In some demonstrative embodiments, controller 154 may be configured to control, cause, and/or trigger device 140 to allocate the first and second allocations of opportunities according to an orthogonal allocation scheme, e.g., as described below.

In one example, the orthogonal allocation scheme may include a combination of OFDMA and CDMA resources, for example, by defining an allocation by a specific resource unit (RU) in frequency, for example, 26 tones, e.g., 9 RUs per 20 MHz channels, and/or any other allocation of any other number or type of RUs.

In another example, the orthogonal allocation scheme may include a combination of OFDMA and CDMA, for example, by defining a specific spatial stream index, which may support an orthogonal spreading code, e.g., a P-matrix code in accordance with an *IEEE 802.11* specification, for example, when applied to HE-LTF fields, e.g., including up to 8 spatial streams on each RU, and/or any other number of streams.

In other embodiments, the orthogonal allocation scheme may include, or may be based on any other additional or alternative resource allocation scheme.

In some demonstrative embodiments, device 140 may be configured to allocate the first and second allocations of opportunities, for example, according to a resource allocation mechanism, which may include, for example, an enhancement of orthogonal allocations, for example, to allow providing a resource allocation, of a first type of resources, which are, for example, uniquely allocated to an associated STA on a long-term basis, e.g., at association, for example, to avoid collisions; and/or a second type of resources, which may be randomly selected, for example, by one or more unassociated STA, e.g., as described below.

In some demonstrative embodiments, the resource allocation mechanism may allow a reduced medium overhead, e.g., in comparison to other contention based methods, for example, by utilizing a contention allocation consuming reduced time and/or frequency resources, e.g., compared to using a resource allocation (RA) based allocation.

In some demonstrative embodiments, the resource allocation mechanism may provide an AP, e.g., device 140, with the ability to manage and/or aggregate a type of resource requests made by a plurality of STAs, e.g., as described below.

In some demonstrative embodiments, the resource allocation mechanism may allow, for example, to tailor an allocated resource size to a request type, e.g., compared to other contention based methods, which may be "one size fits all".

In some demonstrative embodiments, the resource allocation mechanism may allow, for example, to support one or more unassociated STAs, e.g., device 102, operating in a pseudo non-deterministic operation mode, for example, where STAs may pick and choose which instances of short feedback fit their other scheduling constraints, for example, while having minimal impact on medium "wastage", e.g., resources which may be allocated but may eventually not be used, for example, in comparison to other protocols, e.g., RA-based protocols.

In some demonstrative embodiments, devices 102, 160 and/or 180 may receive the short feedback trigger frame including the first allocation of opportunities for the short feedback from the associated stations, and the second allocation of opportunities for the short feedback from the unassociated stations.

In some demonstrative embodiments, a device of devices 102, 160 and/or 180, e.g., device 102, may be configured to process the short feedback trigger frame including the first and second allocations of opportunities.

In some demonstrative embodiments, controller 124 may be configured to control, cause, and/or trigger device 102 to process the short feedback trigger frame including the first and second allocations of opportunities.

In some demonstrative embodiments, controller 124 may be configured to control, cause, and/or trigger device 102 to transmit a short feedback at an opportunity of the first allocation of opportunities, for example, when device 102 is associated with device 140 ("associated mode").

In some demonstrative embodiments, controller 124 may be configured to control, cause, and/or trigger device 102 to transmit a short feedback at an opportunity of the second allocation of opportunities, for example, when device 102 is unassociated with device 140 ("unassociated mode").

In some demonstrative embodiments, device 140 may receive the short feedback from device 102, and/or one or more short feedbacks from devices 160 and/or 180.

In some demonstrative embodiments, controller 154 may be configured to control, cause, and/or trigger device 140 to process a plurality of short feedbacks from a plurality of stations, e.g., including devices 102, 160 and/or 180, for example, according to the first and second allocations of opportunities.

In some demonstrative embodiments, the plurality of short feedbacks may indicate uplink resource requests from the plurality of stations, e.g., from devices 102, 160 and/or 180.

In some demonstrative embodiments, controller 154 may be configured to control, cause, and/or trigger device 140 to transmit a MU trigger frame to allocate uplink resources to the plurality of stations, for example, based on the plurality of short feedbacks from the plurality of stations.

In some demonstrative embodiments, devices 102, 160 and/or 180 may receive the MU trigger frame, which may allocate the uplink resources to the plurality of stations.

In some demonstrative embodiments, a device of devices 102, 160 and/or 180, e.g., device 102, may be configured to process the MU trigger frame from device 140 to allocate uplink resources to the plurality of stations, e.g., including device 102.

In some demonstrative embodiments, controller 124 may be configured to control, cause, and/or trigger device 102 to transmit an uplink transmission to device 140, for example, according to the uplink resources allocated for device 102 by the MU trigger frame.

In some demonstrative embodiments, device 140 may receive a plurality of uplink transmissions, for example, including the uplink transmission from device 102, and one or more uplink transmission from devices 160 and/or 180, e.g., according to the uplink resources allocated by the MU trigger frame.

In some demonstrative embodiments, controller 154 may be configured to control, cause, and/or trigger device 140 to process the uplink transmissions from the plurality of stations according to the uplink resources.

In some demonstrative embodiments, controller 154 may be configured to control, cause, and/or trigger device 140 to transmit a MU block acknowledge (BA) to acknowledge receipt of the uplink transmissions.

In some demonstrative embodiments, devices 102, 160 and/or 180 may receive the MU BA, which may acknowledge receipt of the uplink transmissions by device 140.

In some demonstrative embodiments, a device of devices 102, 160 and/or 180, e.g., device 102, may be configured to process the MU BA frame from device 140.

In some demonstrative embodiments, controller 124 may be configured to control, cause, and/or trigger device 102 to process the MU BA frame from device 140 to acknowledge receipt of the uplink transmission by device 140.

In some demonstrative embodiments, device 140 may receive a short feedback from an unassociated station at an opportunity of the second allocation of opportunities.

In some demonstrative embodiments, device 140 may receive a short feedback from an associated station at an opportunity of the first allocation of opportunities.

In some demonstrative embodiments, the plurality of short feedbacks may include the short feedback from the associated station, e.g., device 102.

In some demonstrative embodiments, device 140 may address the unassociated station, e.g., in the MU trigger frame, using an unassociated identifier (UID), e.g., as described below.

In some demonstrative embodiments, the MU trigger frame may include the UID to identify the unassociated station from which the short feedback has been received at device 140, e.g., as described below.

In some demonstrative embodiments, device 140 may be configured to determine the UID corresponding to an unassociated station from which a short feedback is received, e.g., as described below.

In some demonstrative embodiments, the UID may be derived, for example, from an opportunity number used by the unassociated STA. The UID may be used, for example, to identify an allocation to send a Physical Layer Protocol Data unit (PPDU) to the AP in the associated mode, e.g., as described below.

In some demonstrative embodiments, controller 154 may be configured to control, cause, and/or trigger device 140 to determine a UID corresponding to an unassociated station from which a short feedback is received at an opportunity of the second allocation of opportunities, for example, based on the opportunity at which the short feedback is received from the unassociated station.

In some demonstrative embodiments, the UID of a STA may be derived, for example, by an opportunity number, e.g., an orthogonal allocations ID, which may be used by the STA for the short feedback.

In one example, controller 154 may be configured to control, cause, and/or trigger device 140 to determine a UID assignment based on the opportunity at which the short feedback is received, for example, such that the UID may be uniquely assigned to a STA, for example, such that the UID is not the same as an opportunity ID from another associated or unassociated STAs.

In one example, controller 124 may be configured to control, cause, and/or trigger device 102 to determine a UID assignment for device 102, for example, based on the opportunity at which the short feedback is transmitted by device 102.

In some demonstrative embodiments, the UID may be valid for a predefined period of time, e.g., as described below.

In some demonstrative embodiments, the short feedback trigger frame, the plurality of short feedbacks, the MU trigger frame, and the uplink transmissions may be communicated within a same Transmit Opportunity (TxOP), for example during a single TxOP, e.g., as described below.

In one example, device 140 may be configured to use a UID to allocate, for example, DL or UL resources to an unassociated client, for example, during the same TxOP.

In some demonstrative embodiments, the UID may expire at the end of the TxOP, e.g., as described below.

In some demonstrative embodiments, the UID may not expire at the end of the TxOP. For example, the UID may be used to identify the unassociated STA over a plurality of TxOPs, e.g., as described below.

In some demonstrative embodiments, device 140 may be configured to signal to a STA an indication of an expiration time period after which the UID is to expire, for example, as part of the MU BA, e.g., as described below with reference to FIG. 7.

In some demonstrative embodiments, device 140 may receive a short feedback from an associated station at an opportunity of the first allocation of opportunities.

In some demonstrative embodiments, the plurality of short feedbacks may include the short feedback from the associated station, e.g., device 102.

In some demonstrative embodiments, device 140 may address the associated station, e.g., in the MU trigger frame, using an associated identifier (AID) corresponding to the STA, e.g., as described below.

In some demonstrative embodiments, the MU trigger frame from device 140 may include the AID of device 102, for example, when device 140 receives a short feedback from device 102 at an opportunity of the first allocation of opportunities.

In some demonstrative embodiments, a station associated with device 140, e.g., device 102, may have an association identifier (AID).

In one example, the AID may be defined, for example, during the association between the station and device 140.

In another example, the AID may be defined, for example, using any other method and/or procedure and/or at any other time.

Figure 2:
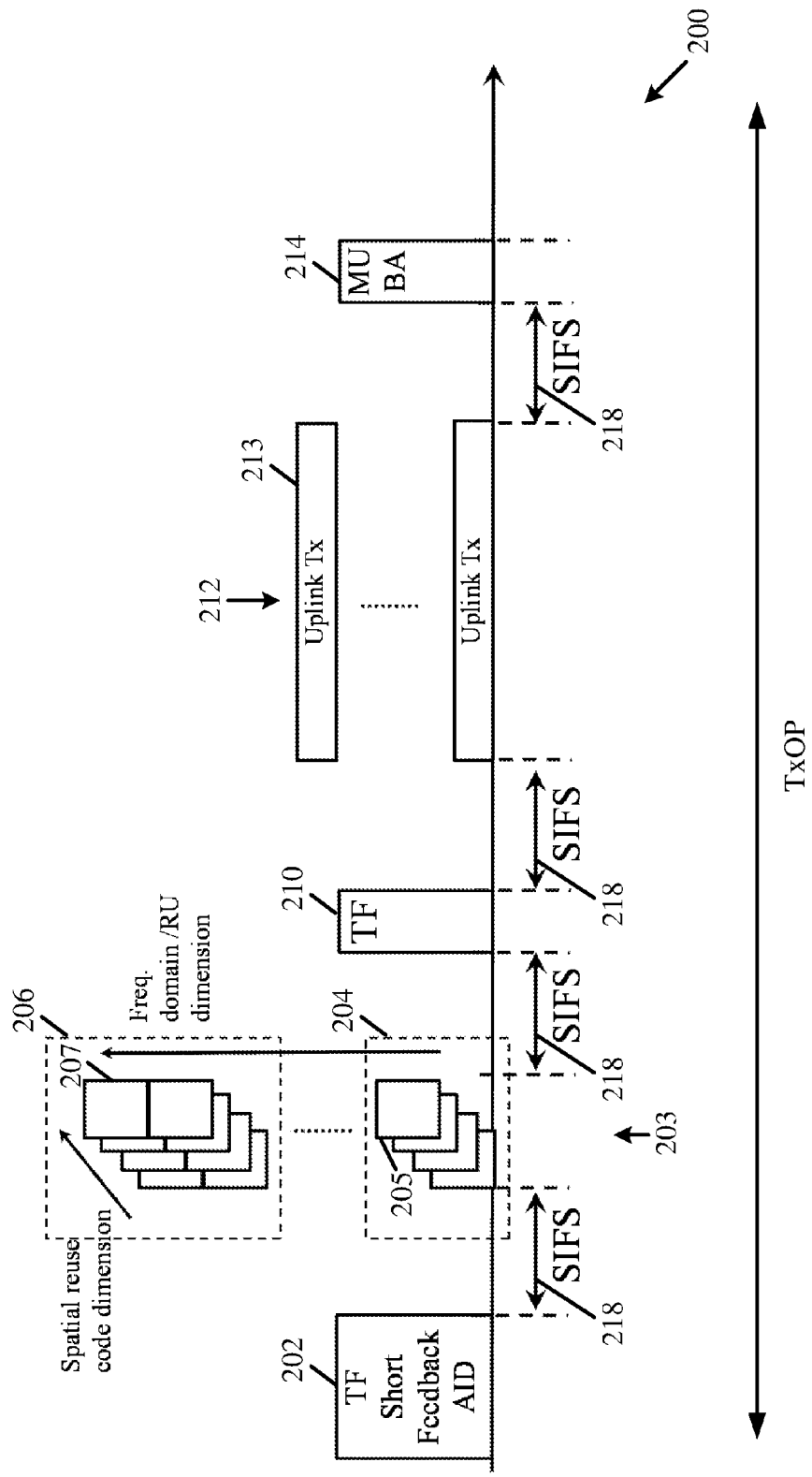
FIG. 2 is a schematic illustration of a Multi-User (MU) resource allocation procedure, which may be implemented in accordance with some demonstrative embodiments.

Reference is made to FIG. 2, which schematically illustrates a MU resource allocation procedure 200, in accordance with some demonstrative embodiments.

In some demonstrative embodiments, one or more operations of the MU resource allocation procedure 200 may be performed by an AP and a plurality of stations, e.g., as described below.

In one example, device 140 (FIG. 1) may be configured to perform one or more operations of the AP, and/or devices 102, 160 and/or 180 may be configured to perform one or more operations of one or more STAs of the plurality of stations.

In some demonstrative embodiments, as shown in FIG. 2, the AP may transmit a short feedback trigger frame 202 including a first allocation of opportunities 204 for short feedback from associated stations, and a second allocation of opportunities 206 for short feedback from unassociated stations.

In some demonstrative embodiments, as shown in FIG. 2, a station may be configured to transmit a short feedback at an opportunity, e.g., an opportunity 205, of the first allocation of opportunities 204, for example, when the station is associated with the AP.

In some demonstrative embodiments, as shown in FIG. 2, a station may be configured to transmit a short feedback at an opportunity, e.g., an opportunity 207, of the second allocation of opportunities 206, for example, when the station is unassociated with the AP.

In some demonstrative embodiments, as shown in FIG. 2, the AP may receive a plurality of short feedbacks from a plurality of stations, e.g., according to the allocations of opportunities 204 and/or 206.

In some demonstrative embodiments, as shown in FIG. 2, the AP may transmit a MU Trigger Frame (TF) 210 to allocate uplink resources 212 to the plurality of stations, for example, based on the plurality of short feedbacks from the plurality of stations.

In some demonstrative embodiments, MU trigger frame 210 may address an unassociated STA using a UID, e.g., as described above.

In some demonstrative embodiments, MU trigger frame 210 may address an associated STA using an AID, e.g., as described above.

In some demonstrative embodiments, a station of the plurality of stations may process the MU trigger frame 210 from the AP.

In some demonstrative embodiments, the station may transmit an uplink transmission to the AP, for example, according to the uplink resources allocated for the station by the MU trigger frame 210.

For example, the MU trigger frame 210 may allocate a resource 213 of uplink resources 212 for the station. According to this example, the station may transmit the uplink transmission to the AP at uplink resource 213.

In some demonstrative embodiments, as shown in FIG. 2, the AP may receive uplink transmissions from the plurality of stations, for example, according to uplink resources 212.

In some demonstrative embodiments, as shown in FIG. 2, the AP may transmit a MU BA 214 to acknowledge receipt of the uplink transmissions from the plurality of stations.

In some demonstrative embodiments, the plurality of stations may receive the MU BA 214, which acknowledges receipt of the uplink transmissions by the AP.

In some demonstrative embodiments, as shown in FIG. 2, the short feedback trigger frame 202, the plurality of short feedbacks over opportunities 203, the MU trigger frame 210, the uplink transmissions 212, and the MU BA may be communicated within a same TxOP, e.g., a single TxOP, and may be separated by a plurality of Short Inter-frame Spaces (SIFS) 218.

In some demonstrative embodiments, the lifespan of the UID may be, for example, longer than the TxOP.

In some demonstrative embodiments, MB BA 214 may include an indication of an expiration time period after which the UID is to expire.

In one example, the same UID/opportunity ID or a different UID/opportunity ID may be uniquely allocated for a particular unassociated STA for a longer period, e.g., if the AP has sufficient opportunity allocations available.

In some demonstrative embodiments, the assignment of UID/opportunity ID may be performed, for example, by adding a signaling in per-STA information of a MU BA sent by the AP in short response to the FTM Requests, e.g., in MU BA 214.

In one example, the UID assignment may be assigned by the AP for any unassociated operation to allocate DL and/or UL resources to an unassociated station for a period longer than TxOP, for example, using a keep-alive timer, which may expire, for example, if the UID is not used for a period longer than a UID timeout period. The UID timeout period may be set, for example, by the AP, another system element, or may be preconfigured, for example, according to a Standard.

For example, the AP may set a timeout period after which the UID assignment will be lost. The timeout may be, for example, decremented over time, and restored to its initial value, e.g., to the UID timeout period, for example, when the unassociated STA and the AP perform a successful exchange, for example, a short feedback followed by a successfully acknowledged uplink request. This may allow, for example, unassociated STAs to avoid collisions during the short feedback request, e.g., as different UIDs may be uniquely assigned for a long period covering a plurality of TxOPs.

In some demonstrative embodiments, a per-STA part of the MU BA 214 may be configured to include a specific signaling, for example, including a UID/opportunity ID assigned to an unassociated station, or an indication that the a same UID as a current UID is to be used by the unassociated station. The MU BA 214 may also include an indication of an initial Timeout value to be applied to manage expiration of the UID.

In some demonstrative embodiments, a new feedback type may be defined, for example, in an HE variant of HT control field, e.g., a UID assignment. Such feedback can be included in the MU BA 214.

Referring back to FIG. 1, in some demonstrative embodiments, devices 102, 140, 160 and or 180 may be configured to perform a MU positioning measurement, e.g., as described below.

In some demonstrative embodiments, device 140 may perform a MU positioning measurement with devices 102, 160, and/or 180, e.g. as described below.

In some demonstrative embodiments, devices 102, 160, and/or 180 may include one or more applications configured to provide and/or to use one or more location based services, e.g., a social application, a navigation application, a location based advertising application, and/or the like. For example, device 102 may include an application 125 to be executed by device 102.

In some demonstrative embodiments, application 125 may use range information between devices 102 and 140, for example, to determine an estimated location of device 102, e.g., with respect to a coordinate system, e.g., a World Geodetic System 1984 (WGS84), and/or a local coordination.

In one example, device 102 may include a Smartphone and device 140 may include an AP, which is located in a shop, e.g., in a shopping mall. According to this example, application 125 may use the range information to determine a relative location of device 102 with respect to device 140, for example, to receive sale offers from the shop.

In another example, device 102 may include a mobile device and device 140 may include a responder station, which is located in a parking zone, e.g., of a shopping mall. According to this example, application 125 may use the range information to determine a location of device 102 in the parking zone, for example, to enable a user of device 102 to find a parking area in the parking zone.

In some demonstrative embodiments, device 102 may include a location estimator 115 configured to perform one or more positioning measurements to be used to estimate a location of device 102, e.g., as described below.

In some demonstrative embodiments, location estimator 115 may be configured to determine a location of device 102, for example, using a plurality of ranges from the plurality of other STAs, e.g., by performing trilateration.

In some demonstrative embodiments, location estimator 115 may include circuitry and/or logic, e.g., processor circuitry and/or logic, memory circuitry and/or logic, and/or any other circuitry and/or logic, configured to perform the functionality of location estimator 115. Additionally or alternatively, one or more functionalities of location estimator 115 may be implemented by logic, which may be executed by a machine and/or one or more processors, e.g., as described below.

In some demonstrative embodiments, at least part of the functionality of location estimator 115 may be implemented as part of controller 124.

In other embodiments, the functionality of location estimator 115 may be implemented as part of any other element of device 102.

In some demonstrative embodiments, location estimator 115 may be configured to estimate the location of device 102, for example, based on time based range measurements, for example, with device 140 and/or one or more other devices.

In some demonstrative embodiments, the time based range measurements may be performed using WLAN communications, e.g., WiFi. For example, using WiFi to perform the time based range measurements may enable, for example, increasing an indoor location accuracy of the location estimation of device 102, e.g., in an indoor environment.

In some demonstrative embodiments, the time based range measurements may include a round trip time (RTT) measurement (also referred to as Time of Flight (ToF) procedure).

In some demonstrative embodiments, a ToF value may be defined as the overall time a signal propagates from a first station, e.g., device 102, to a second station, e.g., device 140, and back to the first station. A distance between the first and second stations may be determined based on the ToF value, for example, by dividing the ToF value by two and multiplying the result by the speed of light.

In some demonstrative embodiments, the ToF measurement procedure may include a Fine Timing Measurement (FTM) procedure.

In some demonstrative embodiments, the ToF measurement procedure may include any other positioning measurement.

In some demonstrative embodiments, devices 102, 140, 160, and/or 180 may be configured to perform one or more FTM measurements, ToF measurements, positioning measurements and/or communications, ranging measurements and/or communications, proximity measurements and/or communications, location estimation measurements and/or communications.

In some demonstrative embodiments, devices 102, 140, 160, and/or 180 may be configured to perform any other additional or alternative positioning measurements and/or communications, ranging measurements and/or communications, proximity measurements and/or communications, location estimation measurements and/or communications, for example, and/or according to any other additional or alternative procedure and/or protocol, e.g., an Received Signal Strength Indication (RSSI) procedure.

Some demonstrative embodiments are described below with respect to FTM measurements according to an FTM procedure. However, other embodiments may be implemented with respect to any other additional or alternative positioning measurements and/or communications, ranging measurements and/or communications, proximity measurements and/or communications, location estimation measurements and/or communications.

In some demonstrative embodiments, devices 102, 140, 160, and/or 180 may be configured to perform one or more FTM measurements, for example, using WLAN communications, e.g., WiFi. For example, using WiFi to perform time based range measurements, e.g., FTM measurements, may enable, for example, increasing an indoor location accuracy of the mobile devices, e.g., in an indoor environment.

In some demonstrative embodiments, devices 102, 160, and/or 180 may perform the functionality of an initiator device, and device 140 may perform the functionality of a responder device. For example, device 140 may include an AP, and/or devices 102, 160, and/or 180 may include a non-AP STA, for example, a mobile device, e.g., a Smartphone, which may perform the FTM protocol with the AP, for example, to determine a location of the mobile device.

In some demonstrative embodiments, device 102 may include a positioning component 117, and/or device 140 may include a positioning component 157, which may be configured to perform one or more positioning measurements, operations and/or communications, e.g., as described below.

In some demonstrative embodiments, positioning components 117 and/or 157 may be configured to perform one or more operations and/or communications of FTM measurements. In other embodiments, positioning components 117 and/or 157 may be configured to perform one or more operations and/or communications of any other positioning measurement.

In some demonstrative embodiments, positioning components 117 and/or 157 may include, or may be implemented, using suitable circuitry and/or logic, e.g., controller circuitry and/or logic, processor circuitry and/or logic, memory circuitry and/or logic, and/or any other circuitry and/or logic, which may be configured to perform at least part of the functionality of positioning components 117 and/or 157. Additionally or alternatively, one or more functionalities of positioning components 117 and/or 157 may be implemented by logic, which may be executed by a machine and/or one or more processors, e.g., as described below.

In some demonstrative embodiments, positioning component 117 may be configured to perform one or more operations of, and/or at least part of the functionality of, message processor 128 and/or controller 124, for example, to trigger communication of one or more FTM messages and/or positioning packets, for example, Non-Data Packets (NDPs), e.g., as described below.

In some demonstrative embodiments, positioning component 157 may be configured to perform one or more operations of, and/or at least part of the functionality of, message processor 158 and/or controller 154, for example, to trigger communication of one or more FTM messages and/or positioning packets, e.g., NDPs, e.g., as described below.

In some demonstrative embodiments, positioning components 117 and/or 157 may be configured to trigger the FTM measurements, for example, periodically and/or or upon a request from an application executed by a device, for example, to determine an accurate location of the device.

In some demonstrative embodiments, positioning components 117 and/or 157 may be configured to perform one or more measurements according to the FTM protocol, e.g., as described below.

In some demonstrative embodiments, positioning components 117 and/or 157 may be configured to perform one or more proximity, ranging, and/or location estimation measurements, e.g., in an indoor location, based on the FTM measurements. For example, the FTM measurements may provide a relatively accurate estimation of location, range and/or proximity, e.g., in an indoor location.

Some demonstrative embodiments are described herein with respect to a positioning component, e.g., positioning components 117 and/or 157, configured to perform measurements according to an FTM protocol and/or procedure. However, in other embodiments, the FTM component may be configured to perform any other additional or alternative type of Time of Flight (ToF) measurements, ranging measurements, positioning measurements, proximity measurements, and/or location estimation measurements, e.g., according to any additional or alternative protocol and/or procedure.

In some demonstrative embodiments, devices 102, 140, 160, and/or 180 may be configured to utilize the FTM Protocol. For example, device 102 may be configured to use the FTM protocol to measure the RTT from a STA implemented by device 102 to a plurality of other STAs, e.g., including device 140, for example, including one or more AP STAs and/or non-AP STAs.

In some demonstrative embodiments, the FTM protocol may be implemented as part of a Specification or protocol, for example, an *IEEE* 802.11 *Specification*, for example, by a task group dealing with WiFi positioning, e.g., *IEEE* 802.11*az—Next Generation positioning*.

In some demonstrative embodiments, the FTM protocol may be configured to enable providing, for example, at least improved capacity, support of high density environments, improved scalability, improved accuracy, and/or one or more additional or alternative advantages, and/or benefits.

In some demonstrative embodiments, devices 102, 140, 160, and/or 180 may be configured to utilize a MU positioning Protocol, e.g. as described below.

In some demonstrative embodiments, the MU positioning protocol may be configured to support MU capabilities and/or communications, for example, in accordance with a Specification or protocol, for example, an *IEEE* 802.11 *Specification*, for example, an *IEEE* 802.11*ax Specification*. In one example, a MU FTM protocol, e.g., as described herein, may allow merging between a multi user managing protocol, e.g., in accordance with an *IEEE* 802.11*ax Specification*, and advanced FTM measurement for positioning. For example, an *IEEE* 802.11*ax Specification* may be focused on data transfer for multi-users, mostly for associated STAs.

In some demonstrative embodiments, devices 102, 140, 160, and/or 180 may be configured to utilize a MU positioning Protocol, for example, which may be configured to support positioning measurements by unassociated stations and/or associated stations, e.g., as described below.

In some demonstrative embodiments, the MU resource allocation mechanism described above may be implemented for re-use in a MU positioning protocol, e.g., in a future *IEEE* 802.11*az Specification*.

In some demonstrative embodiments, for example, it may be advantageous to implement a positioning protocol with MU support, for example, to provide specific *IEEE* 802.11*ax* support, e.g., for a future *IEEE* 802.11*ax Specification*, e.g., as described below.

In some demonstrative embodiments, a short feedback trigger frame, e.g., short feedback trigger frame 202 (FIG. 2), may be configured to support a MU positioning protocol, e.g., as described below.

In some demonstrative embodiments, an AP, e.g., device 140, may be configured to indicate a new short feedback polling type, e.g., a "positioning resource", which may be configured, for example, for a purpose of a MU positioning measurement protocol, e.g., as described below.

In some demonstrative embodiments, a short feedback polling mechanism may be configured, for example, to allow for unassociated STAs and/or associated STAs to make resource requests, e.g., as described below.

In some demonstrative embodiments, a MU positioning protocol sequence may be configured, for example, to combine one or more features of the short feedback mechanism, e.g., as described above with reference to FIG. 2, with a measurement sequence, e.g., in accordance with a future *IEEE* 802.11*az Specification*, e.g., as described below.

In some demonstrative embodiments, one or more operations, messages, and/or communications of MU resource allocation procedure 200 (FIG. 2) may be configured to support, for example, a MU positioning procedure, e.g., as described below.

In some demonstrative embodiments, the short feedback trigger frame 202 (FIG. 2) may include a polling type indication to indicate polling for a positioning measurement, e.g., as described below.

In some demonstrative embodiments, the plurality of uplink transmissions, e.g., at uplink resources 212 (FIG. 2), may include a plurality of positioning measurement requests, e.g., as described below.

In some demonstrative embodiments, the plurality of uplink transmissions may include Fine Timing Measurement (FTM) requests and/or any other type of positioning requests, e.g., as described below.

In some demonstrative embodiments, device 140 may be configured to perform a plurality of positioning measurement sequences with the plurality of stations from which the short feedbacks are received, for example, based on the plurality of measurement requests, e.g., as described below.

In some demonstrative embodiments, device 102, 160, and/or 180 may be configured to perform a plurality of positioning measurement sequences with device 140, for example, based on the plurality of measurement requests, e.g., as described below.

Figure 3:
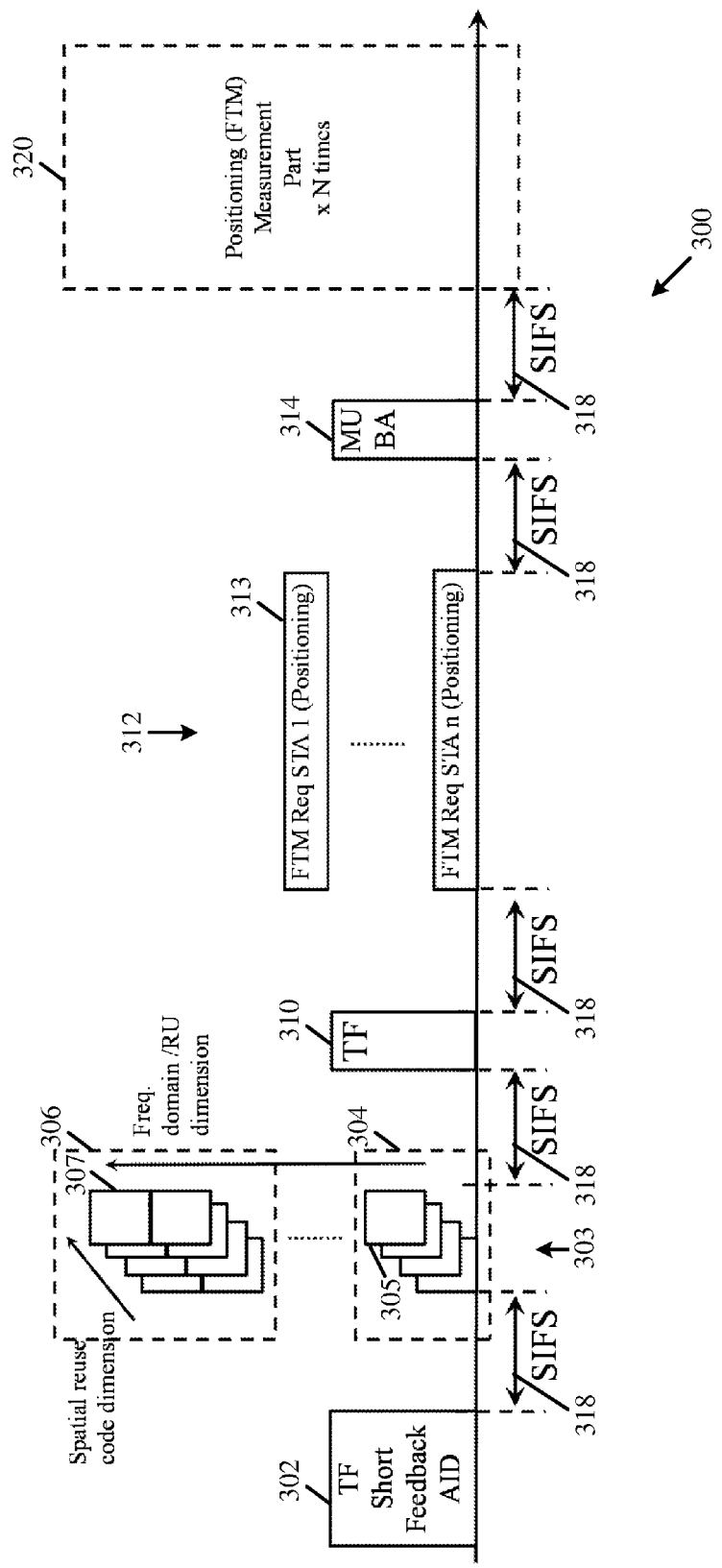
FIG. 3 is a schematic illustration of a MU positioning procedure, which may be implemented in accordance with some demonstrative embodiments.

Reference is made to FIG. 3, which schematically illustrates a MU positioning procedure 300, in accordance with some demonstrative embodiments.

In some demonstrative embodiments, one or more operations of the MU positioning procedure 300 may be performed by an AP and a plurality of stations.

In one example, device 140 (FIG. 1) may be configured to perform one or more operations of the AP, and/or devices 102, 160 and/or 180 (FIG. 1) may be configured to perform one or more operations of one or more stations of the plurality of stations.

In some demonstrative embodiments, MU positioning procedure 300 may include transmission of a trigger frame for short feedback, for example, to allow STAs that are associated with the AP and/or STAs that are unassociated with the AP, to send a short response to the trigger frame for short feedback, for example, in order to indicate to the AP that the STAs would like to participate in a measurement sequence, e.g., as described below.

In some demonstrative embodiments, MU positioning procedure 300 may include collection of FTM requests from STAs, which may be selected by the AP to participate in the measurement sequence. The collection of the requests may be triggered by the AP, for example using a MU trigger frame, e.g., as described below.

In some demonstrative embodiments, MU positioning procedure 300 may include performing MU positioning measurements between the plurality of stations and the AP, e.g., as described below.

In some demonstrative embodiments, as shown in FIG. 3, the AP may transmit a short feedback trigger frame 302 including a polling type indication to indicate polling for a positioning measurement.

In some demonstrative embodiments, short feedback trigger frame 302 may include a short feedback allocation of opportunities 303.

In some demonstrative embodiments, the short feedback allocation 303 may be divided into at least two non-overlapping allocations, e.g., as described below.

In some demonstrative embodiments, the short feedback allocation 303 may include a first allocation of opportunities 304 for short feedback from associated stations, and a second allocation of opportunities 306 for short feedback from unassociated stations.

In one example, the first allocation of opportunities 304 may include a non-contention based allocation of resources, which may be used, for example, by associated STAs. For example, the associated STAs may be identified by an AID, and may be polled for a specific action, e.g., to indicate whether or not a positioning measurement is requested.

For example, the first allocation of opportunities 304 may be utilized to poll one or more associated STAs for the MU positioning measurement, or any other action, e.g., as described below.

In some demonstrative embodiments, the second allocation of opportunities 306 may include a contention-based allocation of resources, which may be used, for example, by unassociated STAs, e.g., to indicate whether or not a positioning measurement is requested.

For example, the unassociated STAs may, for example, randomly select a slot of the opportunity space of the contention-based opportunities 306 dedicated for unassociated stations.

In some demonstrative embodiments, a STA wishing to perform a positioning measurement may be configured to send a short response during an opportunity of the first allocation of opportunities 304, for example, if the STA is associated with the AP, or during the second allocation of opportunities 306, for example, if the STA is unassociated with the AP.

In some demonstrative embodiments, as shown in FIG. 3, a STA may be configured to transmit a short feedback at an opportunity, e.g., an opportunity 305, of the first allocation of opportunities 304, for example, when the STA is associated with the AP.

In some demonstrative embodiments, as shown in FIG. 3, a STA may be configured to transmit a short feedback at an opportunity, e.g., an opportunity 307, of the second allocation of opportunities 306, for example, when the STA is unassociated with the AP.

In some demonstrative embodiments, as shown in FIG. 3, the AP may receive a plurality of short feedbacks from a plurality of stations that request to perform positioning measurements with the AP, e.g., according to the allocations 304 and/or 306.

In some demonstrative embodiments, as shown in FIG. 3, the AP may transmit a MU trigger frame 310 to allocate uplink resources 312 to the plurality of stations, e.g., from which the AP has received during allocations 304 and/or 306 short responses indicating a request to perform a positioning measurement.

In some demonstrative embodiments, as shown in FIG. 3, MU trigger frame 310 may be transmitted following the short feedback allocation 303, e.g., a SIFS after the short feedback allocation 303.

In some demonstrative embodiments, MU trigger frame 310 may address an associated STA in the MU trigger frame 310 using an AID of the associated STA.

In one example, the MU trigger frame 310 may address and/or identify one or more associated STAs, which made use of the non-contention part, for example, by their AID.

In some demonstrative embodiments, MU trigger frame 310 may address an unassociated STA using a UID.

In one example, the AP may be configured to use a UID in a positioning measurement part, for example, to uniquely identify an allocation to be used by an unassociated station for a measurement exchange part, e.g., a measurement sequence, purpose, addressing, and/or capabilities, as described below.

In one example, the MU trigger frame 310 may address and/or identify one or more unassociated STAs, for example, by their UIDs, e.g., as described below In some demonstrative embodiments, the UID may have a lifespan, for example, of up to a TxOP, e.g., the same TxOP during which the short trigger frame 302 is communicated. Alternatively, the same UID/opportunity ID or a different UID/opportunity ID may be uniquely allocated for a particular unassociated STA for a longer period, e.g., if the AP has sufficient opportunity allocations available, e.g., as described below.

In some demonstrative embodiments, a station of the plurality of stations may process the MU trigger frame 310 from the AP.

In some demonstrative embodiments, the station may transmit a positioning measurement request, e.g., an FTM request, to the AP, for example, according to the uplink resources allocated by the MU trigger frame 310.

For example, the MU trigger frame 310 may allocate a resource 313 in uplink resources 312 for the station, for example, by assigning the resource 313 to an AID of the station, e.g., if the station is associated with the AP, or by assigning the resource 313 to a UID, e.g., if the station is unassociated with the AP. According to this example, the device may transmit the FTM request to the AP at uplink resource 313.

In some demonstrative embodiments, as shown in FIG. 3, the AP may receive FTM requests from the plurality of stations, for example, according to the uplink resources 312 allocated by the MU trigger frame 310.

In some demonstrative embodiments, as shown in FIG. 3, the AP may transmit a MU BA 314 to acknowledge receipt of the FTM requests.

In some demonstrative embodiments, the plurality of stations may receive the MU BA 314, which acknowledges receipt of the FTM requests.

In some demonstrative embodiments, as shown in FIG. 3, the short feedback trigger frame 302, the plurality of short feedbacks over opportunities 303, the MU trigger frame 310, the uplink transmissions 312, and the MU BA may be within a same TxOP, and may be separated by a plurality of SIFS 318.

In some demonstrative embodiments, as shown in FIG. 3, the AP may perform a plurality of positioning measurement sequences 320 with the plurality of stations, for example, based on the plurality of FTM requests received over the uplink resources 312, e.g., as described below.

In some demonstrative embodiments, as the number of opportunities in the Short Feedback allocation of opportunities 306 may be reasonably large, the probability of collisions over the contention-based opportunities 306 may be kept to an acceptable level, however collisions may still occur over the contention-based opportunities 306.

In some demonstrative embodiments, the AP, e.g., device 140 (FIG. 1), may be configured to implement a resolution mechanism for UID, for example, based on a MAC address contained in a Physical Layer Protocol Data Unit (PPDU) received by the AP from an unassociated STA over an uplink resource 312, for example, using the MU BA 314 to associate the UID with a specific STA transmitting the correctly received PPDU over the uplink resource 312.

In some demonstrative embodiments, these collisions may be resolved during the reception of a following uplink request and transmission of the MU BA, e.g., as described below.

In some demonstrative embodiments, for example, two STAs may select to transmit a short feedback during a same opportunity 305. The AP may detect the short feedback over the opportunity 305 and may accordingly assign a UID corresponding to the opportunity 305, e.g., as described above. The AP may include in trigger frame 310 an indication of the uplink resource assigned to the UID. As a result, both of the two STAs may determine the same uplink resource 313 to be used for transmitting FTM requests to the AP. However, in such a situation, the AP may correctly decode at most only one message.

In some demonstrative embodiments, the AP may indicate in the MU BA 314 a MAC address of the FTM correctly decoded by the AP over the uplink resource 313. This indicated MAC address, for example, when combined with the UID indicated in the trigger frame 310, may resolve the collision between the two STAs.

In some demonstrative embodiments, the AP may set the MU trigger frame 310 to allocate a particular uplink resource in uplink resources 312, for example, based on a short feedback received at an opportunity of the second allocation of opportunities 306.

In some demonstrative embodiments, a first unassociated station of the plurality of stations may transmit a first FTM request including a MAC address of the first station, e.g., over the particular uplink resource.

In some demonstrative embodiments, a second unassociated station of the plurality of stations may transmit a second FTM request including a MAC address of the second station, e.g., over the uplink resource.

In some demonstrative embodiments, the AP may receive at most only one request of the first and second FTM request, e.g., only the first FTM request from the first unassociated station.

In some demonstrative embodiments, the AP may transmit the MU BA 314 including the MAC address of an unassociated station from which the uplink transmission is received over the uplink resource.

For example, the AP may transmit the MU BA 314 including the first MAC address of the first unassociated station.

In some demonstrative embodiments, the first and second unassociated stations may receive the MU BA 314 including the first MAC address of the first unassociated station. Accordingly, the second unassociated station may be aware that the positioning measurement may be performed with the first unassociated station.

Figure 4:
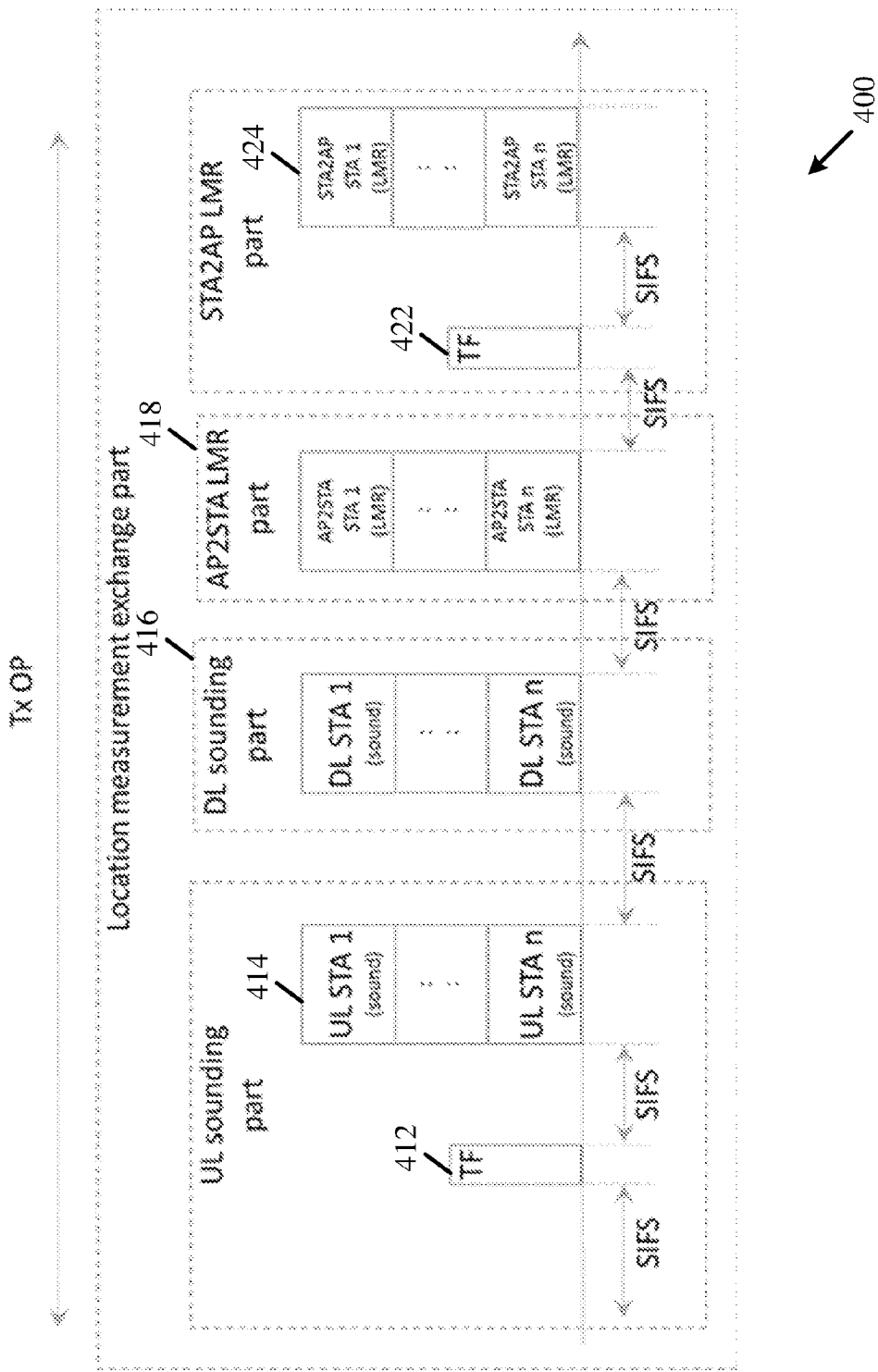
FIG. 4 is a schematic illustration of messages of a MU positioning measurement procedure, in accordance with some demonstrative embodiments.

Reference is made to FIG. 4, which schematically illustrates messages of a MU positioning measurement procedure 400, which may be implemented in accordance with some demonstrative embodiments.

In some demonstrative embodiments, MU positioning measurement procedure 400 may be implemented in compliance with a future *IEEE* 802.11*az Specification.*

In one example, devices 102, 140, 106 and/or 180 (FIG. 1) may perform the plurality of positioning measurement sequences 320 (FIG. 3), for example, according to MU positioning protocol 400.

In some demonstrative embodiments, an AP, e.g., device 140 (FIG. 1), may perform MU positioning measurement procedure 400 with a plurality of stations, e.g., devices 102, 160 and/or 180 (FIG. 1), for example, to perform a MU positioning measurements between the AP and the plurality of stations.

In some demonstrative embodiments, as shown in FIG. 4, the AP may transmit a trigger frame (TF) 412 to the plurality of stations, for example, to trigger a MU positioning measurement.

In some demonstrative embodiments, as shown in FIG. 4, the plurality of stations may transmit a plurality of UL sounding transmissions 414 to the AP, for example, as part of a MU uplink transmission, e.g., simultaneously.

In one example, the plurality of UL sounding transmissions 414 may include a plurality of NDPs.

In some demonstrative embodiments, as shown in FIG. 4, the AP may transmit a MU DL sounding transmission 416 to the plurality of stations, for example, in the form of a MU NDP.

In some demonstrative embodiments, as shown in FIG. 4, the AP may transmit a MU Location Management Report (LMR) 418 to the plurality of stations, for example, in the form of a MU downlink transmission. For example, LMR 418 may include, for a station, one or more positioning measurements between the AP and the STA, e.g., based on an UL sounding transmission 414 from the STA and/or a DL sounding transmission 416 to the STA.

In some demonstrative embodiments, the plurality of stations may be configured to determine one or more positioning parameters, for example, based on LMR 418, MU sounding transmission 416, and/or the plurality of sounding transmissions 414.

In some demonstrative embodiments, as shown in FIG. 4, the AP may transmit a TF 422 to the plurality of stations, for example, to trigger a plurality of location reports from the plurality of stations.

In some demonstrative embodiments, as shown in FIG. 4, the plurality of stations may transmit a plurality of LMRs 424 to the AP, for example, as part of a MU uplink transmission, e.g., simultaneously.

In some demonstrative embodiments, the AP may be configured to determine one or more positioning parameters with respect to the AP and/or the plurality of stations, for example, based on LMRs 424.

Figure 5:
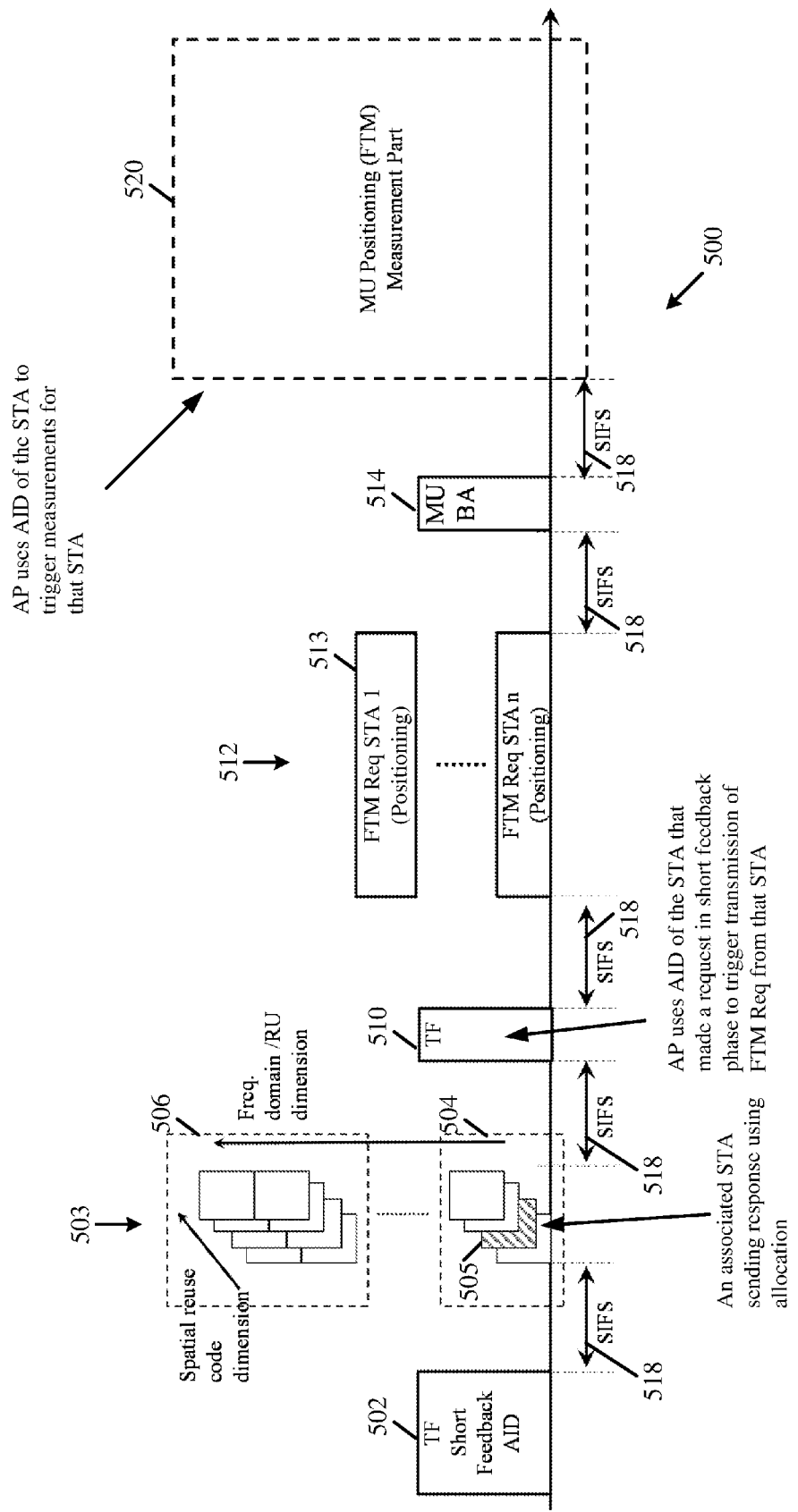
FIG. 5 is a schematic illustration of a MU positioning procedure including communications with one or more associated stations (STAs), in accordance with some demonstrative embodiments.

Reference is made to FIG. 5, which schematically illustrates a MU positioning procedure 500 including communications with one or more associated STAs, in accordance with some demonstrative embodiments.

In some demonstrative embodiments, one or more operations of the MU positioning 500 may be performed between an AP and a plurality of stations including one or more associated stations.

In one example, device 140 (FIG. 1) may be configured to perform one or more operations of the AP, and/or devices 102, 160 and/or 180 (FIG. 1) may be configured to perform one or more operations of one or more of the plurality of stations.

In some demonstrative embodiments, as shown in FIG. 5, the AP may transmit a short feedback trigger frame 502 including a polling type indication to indicate polling for a positioning measurement.

In some demonstrative embodiments, short feedback trigger frame 502 may include a short feedback allocation of opportunities 503.

In some demonstrative embodiments, as shown in FIG. 5, the short feedback allocation of opportunities 503 may be divided into at least two non-overlapping parts, e.g., as described below.

In some demonstrative embodiments, as shown in FIG. 5, the short feedback allocation 503 may include a first allocation of opportunities 504 for short feedback from associated stations, and a second allocation of opportunities 506 for short feedback from unassociated stations.

In one example, the first allocation of opportunities 504 may include non-contention based opportunities, which may be allocated, for example, for associated STAs. For example, the associated STAs may be identified by an AID, and may be polled for a specific action, e.g., to indicate a request to perform a positioning measurement.

In some demonstrative embodiments, as shown in FIG. 5, an associated STA of the plurality of associated stations may be assigned with an allocation 505, e.g., a unique allocation.

In some demonstrative embodiments, the associated STA may be configured to send a short response during the allocation 505 assigned to the associated STA, for example, if the associated STA wishes to perform a positioning measurement with the AP.

In some demonstrative embodiments, as shown in FIG. 5, the AP may receive the short feedback from the associated STA in the assigned opportunity 505.

In some demonstrative embodiments, the AP may determine the AID of the associated station, for example, based on the allocation 505 over which the short feedback from the associated STA is received.

In some demonstrative embodiments, as shown in FIG. 5, the AP may transmit a MU trigger frame 510 to allocate uplink resources 512 to the plurality of stations, e.g., from which the AP has received a short response indicating a request to perform a positioning measurement.

In some demonstrative embodiments, as shown in FIG. 5, MU trigger frame 510 may be transmitted following the short feedback allocation 503, e.g., a SIFS after the short feedback allocation 503.

In some demonstrative embodiments, MU trigger frame 510 may address the associated STA in the MU trigger frame 510 using the AID of the associated STA, which corresponds to the short feedback over the allocation 505.

In one example, the MU trigger frame 510 may address and/or identify one or more associated STAs, which made use the non-contention based opportunities 504, for example, by their AID.

In some demonstrative embodiments, the associated station may process the MU trigger frame 510 from the AP.

In some demonstrative embodiments, the associated station may transmit a positioning measurement request, e.g., an FTM request, to the AP, for example, according to the uplink resources allocated by the MU trigger frame 510.

For example, the MU trigger frame 510 may allocate a resource 513 in uplink resources 512 for the AID of the associated station from which the short feedback is received over opportunity 505. According to this example, the associated STA may transmit the FTM request to the AP at uplink resource 513.

In some demonstrative embodiments, as shown in FIG. 5, the AP may transmit a MU BA 514 to acknowledge receipt of the FTM requests.

In some demonstrative embodiments, the plurality of associated stations may receive the MU BA 514, which acknowledges receipt of the FTM requests.

In some demonstrative embodiments, as shown in FIG. 5, the AP may perform a plurality of positioning measurement sequences 520 with the plurality of stations, for example, based on the plurality of FTM requests.

In some demonstrative embodiments, as shown in FIG. 5, the AP may use the AID of the associated station, which made a request in allocation 505, for example, to trigger a positioning measurement for the associated station.

Figure 6:
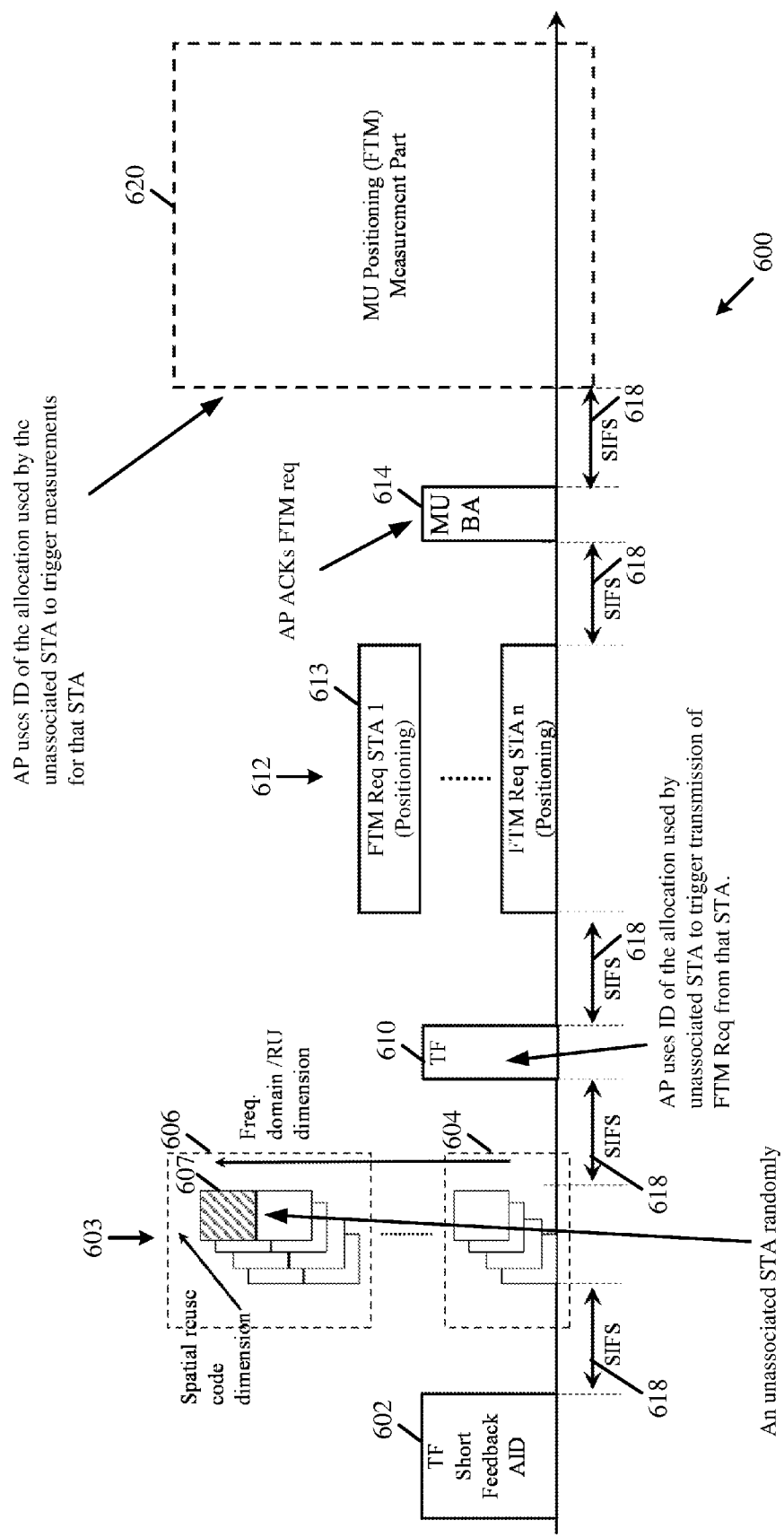
FIG. 6 is a schematic illustration of a MU positioning procedure including communications with one or more unassociated STAs, in accordance with some demonstrative embodiments.

Reference is made to FIG. 6, which schematically illustrates a MU positioning procedure 600 including communications with one or more unassociated STAs, in accordance with some demonstrative embodiments.

In some demonstrative embodiments, one or more operations of the MU positioning 600 may be performed between an AP and a plurality of stations including one or more unassociated stations.

In one example, device 140 (FIG. 1) may be configured to perform one or more operations of the AP, and/or devices 102, 160 and/or 180 (FIG. 1) may be configured to perform one or more operations of one or more stations of the plurality of stations.

In some demonstrative embodiments, as shown in FIG. 6, the AP may transmit a short feedback trigger frame 602 including a polling type indication to indicate polling for a positioning measurement.

In some demonstrative embodiments, short feedback trigger frame 602 may include a short feedback allocation of opportunities 603.

In some demonstrative embodiments, as shown in FIG. 6, the short feedback allocation of opportunities 603 may be divided into at least two non-overlapping parts, e.g., as described below.

In some demonstrative embodiments, as shown in FIG. 6, the short feedback allocation 603 may include a first allocation of opportunities 604 for short feedback from associated stations, and a second allocation of opportunities 606 for short feedback from unassociated stations.

In some demonstrative embodiments, the second allocation of opportunities 606 may include a contention-based allocation, which may be used, for example, by unassociated STAs.

In some demonstrative embodiments, an unassociated STA may be configured to randomly select an allocation from the second allocation of opportunities 606, for example, to send a short response at the selected allocation.

For example, the unassociated STA may select a contention-based allocation 607, e.g., from the second allocation of opportunities 606.

In some demonstrative embodiments, the unassociated STA may be configured to send a short feedback during the allocation 607, for example, if the unassociated STA wishes to perform a positioning measurement with the AP.

In some demonstrative embodiments, as shown in FIG. 6, the AP may receive the short feedback from the unassociated STA in the allocation 607.

In some demonstrative embodiments, the AP may not be aware of an identifier, e.g., an AID, of the unassociated STA.

In some demonstrative embodiments, the AP may determine a UID to identify the unassociated station, for example, based on the allocation 607 at which the short feedback is received, e.g., as described above.

In some demonstrative embodiments, as shown in FIG. 6, the AP may transmit a MU trigger frame 610 to allocate uplink resources 612 to the plurality of stations, e.g., from which the AP has received a short response indicating a request to perform a positioning measurement.

In some demonstrative embodiments, as shown in FIG. 6, MU trigger frame 610 may be transmitted following the Short Feedback allocation 603, e.g., a SIFS after the short feedback allocation 603.

In one example, the MU trigger frame 610 may address and/or identify one or more unassociated STAs, for example, by their UID, e.g., as described below.

In some demonstrative embodiments, the AP may use the UID assigned based on the allocation 607 used by the unassociated STA, for example, to trigger a transmission of an FTM Request from the unassociated STA.

In some demonstrative embodiments, MU trigger frame 610 may address the unassociated STA from which the short feedback is received during the allocation 607, for example, using the UID corresponding to the allocation 607.

In some demonstrative embodiments, the unassociated station may process the MU trigger frame 610 from the AP.

In some demonstrative embodiments, the unassociated station may transmit a positioning measurement request, e.g., an FTM request, to the AP, for example, according to the uplink resources allocated by the MU trigger frame 610 with respect to the UID corresponding to the allocation 607.

For example, the MU trigger frame 610 may allocate a resource 613 in uplink resources 612 for the UID corresponding to the allocation 607. According to this example, the unassociated STA, which transmitted the short feedback over allocation 607, may transmit the FTM request to the AP at uplink resource 613.

In some demonstrative embodiments, the AP may receive the FTM request over uplink resource 613.

In some demonstrative embodiments, the AP may retrieve a MAC address of the unassociated STA, for example, from the FTM request received from the unassociated STA.

In some demonstrative embodiments, as shown in FIG. 6, the AP may transmit a MU BA 614 to acknowledge receipt of the FTM requests.

In some demonstrative embodiments, the plurality of unassociated stations may receive the MU BA 614, which acknowledges receipt of the FTM requests.

In some demonstrative embodiments, as shown in FIG. 6, the AP may perform a plurality of positioning measurement sequences 620 with the plurality of stations, for example, based on the plurality of FTM requests.

In some demonstrative embodiments, the AP may use the UID of the unassociated station, which made a request in allocation 607, for example, to trigger a positioning measurement for the unassociated station.

In some demonstrative embodiments, the lifespan of the UID may be, for example, of up to a TxOP, e.g., the same TxOP during which the trigger frame 602 is communicated.

In some demonstrative embodiments, the UID may expire at the end of the TxOP.

In some demonstrative embodiments, a same UID/opportunity ID or a different UID/opportunity ID may be uniquely allocated for a particular unassociated STA for a longer period, e.g., if the AP has sufficient opportunity allocations available.

Figure 7:
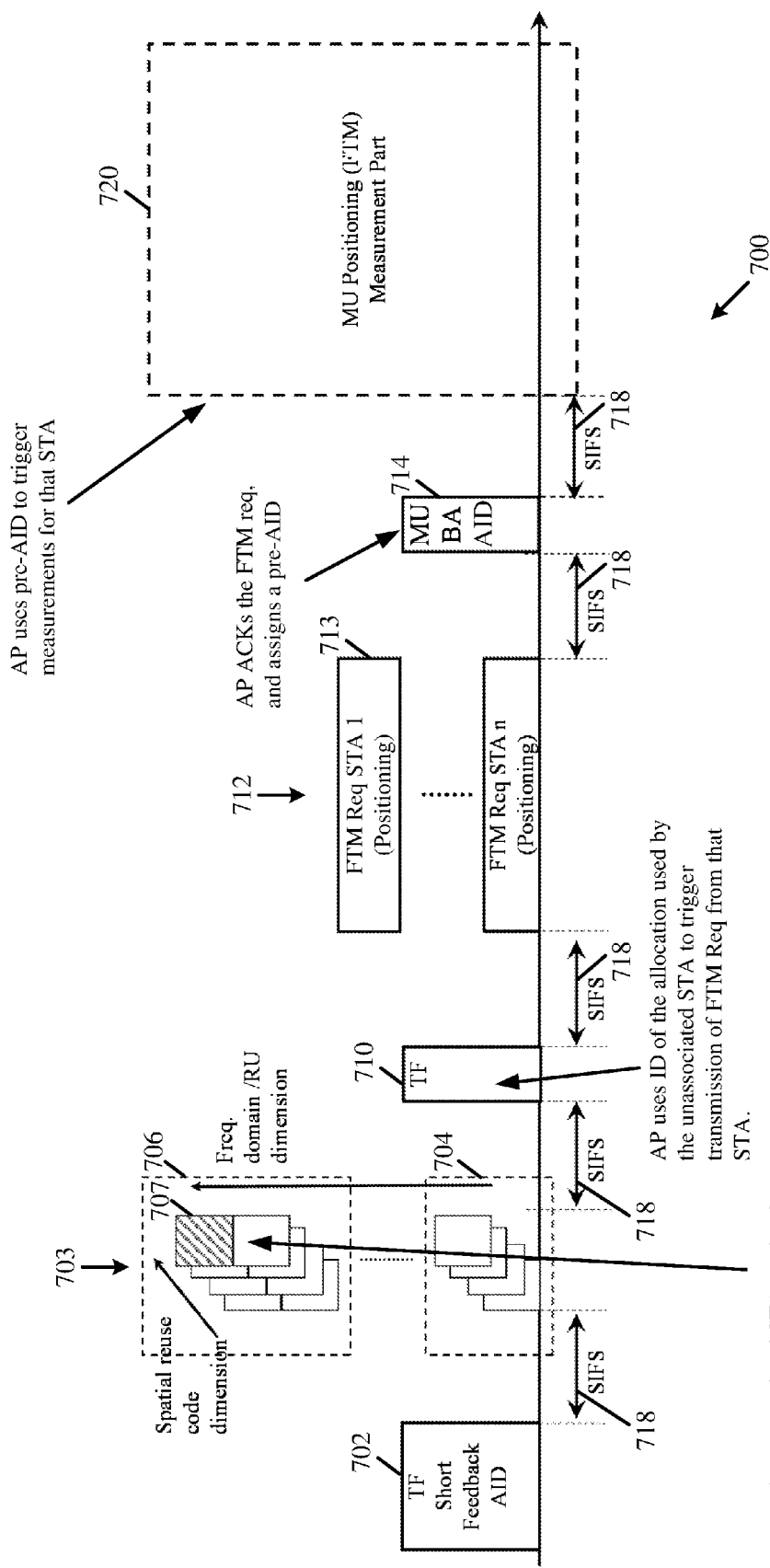
FIG. 7 is a schematic illustration of a MU positioning procedure including communications with one or more unassociated STAs, in accordance with some demonstrative embodiments.

Reference is made to FIG. 7, which schematically illustrates a MU positioning procedure 700 including communications with one or more unassociated STAs, in accordance with some demonstrative embodiments.

In some demonstrative embodiments, one or more operations of the MU positioning procedure 700 may be performed between an AP and a plurality of stations including one or more unassociated stations.

In one example, device 140 (FIG. 1) may be configured to perform one or more operations of the AP, and/or devices 102, 160 and/or 180 (FIG. 1) may be configured to perform one or more operations of one or more stations of the plurality of unassociated stations.

In some demonstrative embodiments, as shown in FIG. 7, the AP may transmit a short feedback trigger frame 702 including a polling type indication to indicate polling for a positioning measurement.

In some demonstrative embodiments, short feedback trigger frame 702 may include a short feedback allocation of opportunities 703.

In some demonstrative embodiments, as shown in FIG. 7, the short feedback allocation of opportunities 703 may be divided into at least two non-overlapping parts, e.g., as described below.

In some demonstrative embodiments, as shown in FIG. 7, the allocation of opportunities 703 may include a first allocation of opportunities 704 for short feedback from associated stations, and a second allocation of opportunities 706 for short feedback from unassociated stations.

In some demonstrative embodiments, the second allocation of opportunities 706 may include a contention-based allocation, which may be used, for example, by unassociated STAs.

In some demonstrative embodiments, an unassociated STA may be configured to randomly select an allocation from the second allocation of opportunities 706, for example, to send a short response at the selected allocation.

For example, the unassociated STA may select a contention-based allocation 707, e.g., from the second allocation of opportunities 706.

In some demonstrative embodiments, the unassociated STA may be configured to send a short feedback at the allocation 707, for example, if the unassociated STA wishes to perform a positioning measurement with the AP.

In some demonstrative embodiments, as shown in FIG. 7, the AP may receive the short feedback from the unassociated STA in the allocation 707.

In some demonstrative embodiments, the AP may not be aware of an identifier, e.g., an AID, of the unassociated STA.

In some demonstrative embodiments, the AP may determine a UID to identify the unassociated station, for example, based on the allocation 707 at which the short feedback is received, e.g., as described above.

In some demonstrative embodiments, as shown in FIG. 7, the AP may transmit a MU trigger frame 710 to allocate uplink resources 712 to the plurality of stations, e.g., from which the AP has received a short response indicating a request to perform a positioning measurement.

In some demonstrative embodiments, as shown in FIG. 7, MU trigger frame 710 may be transmitted following the Short Feedback allocation 703, e.g., a SIFS after the short feedback allocation 703.

In one example, the MU trigger frame 710 may address and/or identify one or more unassociated STAs, for example, by their UID, e.g., as described below.

In some demonstrative embodiments, the AP may use the UID assigned based on the allocation 707 used by the unassociated STA, for example, to trigger a transmission of an FTM Request from the unassociated STA.

In some demonstrative embodiments, MU trigger frame 710 may address the unassociated STA from which the short feedback is received during the allocation 707, for example, using the UID corresponding to the allocation 707.

In some demonstrative embodiments, the unassociated station may process the MU trigger frame 710 from the AP.

In some demonstrative embodiments, the unassociated station may transmit a positioning measurement request, e.g., an FTM request, to the AP, for example, according to the uplink resources allocated by the MU trigger frame 710 with respect to the UID corresponding to the allocation 707.

For example, the MU trigger frame 710 may allocate a resource 713 in uplink resources 712 for the UID corresponding to the allocation 707. According to this example, the unassociated STA, which transmitted the short feedback over allocation 707, may transmit the FTM request to the AP at uplink resource 713.

In some demonstrative embodiments, the AP may receive the FTM request over uplink resource 713.

In some demonstrative embodiments, the AP may retrieve a MAC address of the unassociated STA, for example, from the FTM request received from the unassociated STA.

In some demonstrative embodiments, as shown in FIG. 7, the AP may transmit a MU BA 714 to acknowledge receipt of the FTM requests.

In some demonstrative embodiments, as shown in FIG. 7, the AP may assign an identifier, for example, a pre-AID, to the unassociated station, for example, based on the MAC address of the unassociated station, e.g., as retrieved from the FTM request received over uplink resource 713.

In some demonstrative embodiments, as shown in FIG. 7, the AP may signal to the unassociated station the pre-AID assigned to the unassociated station, for example, via the MU BA 714. In one example, the AP may include the pre-AID assigned to the unassociated station in the MU BA 714, for example, in association with an indication of the uplink resource 713 over which the FTM request was received from the unassociated STA.

In some demonstrative embodiments, as shown in FIG. 7, the AP may use the pre-AID, for example, to identify the unassociated station, for example, during a positioning measurement sequence, e.g., as described below.

In some demonstrative embodiments, as shown in FIG. 7, the AP may perform a plurality of positioning measurement sequences 720 with the plurality of stations, for example, based on the plurality of FTM requests.

In some demonstrative embodiments, as shown in FIG. 7, the AP may use the pre-AID assigned to the unassociated station in the MU BA 714, for example, to trigger positioning measurements with the unassociated station. For example, the AP may include the pr-AID of the unassociated station in trigger frame 412 (FIG. 4) to identify the unassociated station during the MU positioning measurement procedure.

Figure 8:
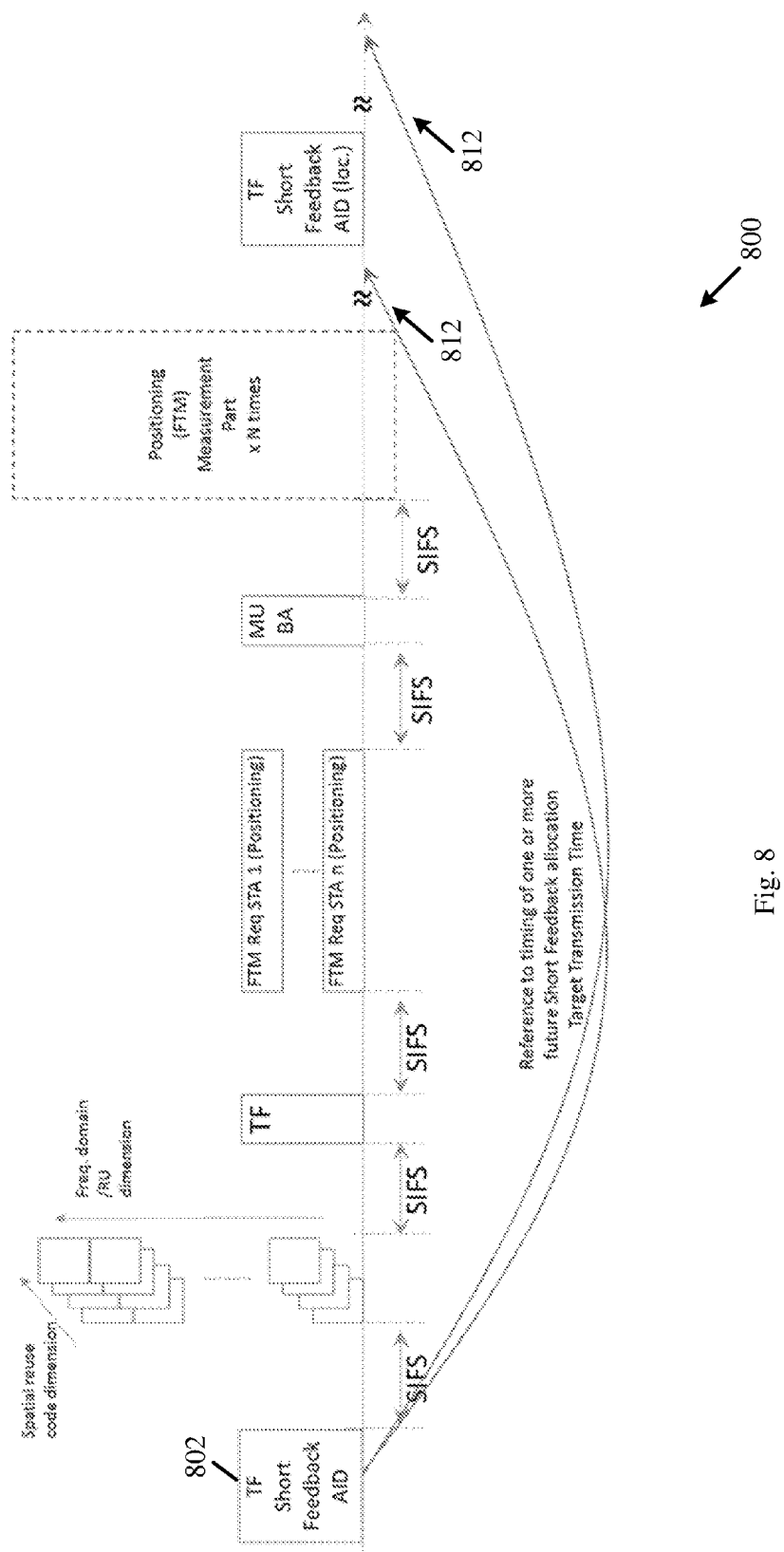
FIG. 8 is a schematic illustration of a MU positioning procedure with an indication of a subsequent resource allocation, in accordance with some demonstrative embodiments.

Reference is made to FIG. 8, which schematically illustrates a MU positioning procedure 800 with an indication of a subsequent resource allocation, in accordance with some demonstrative embodiments.

In some demonstrative embodiments, one or more operations of the MU positioning procedure 800 may be performed between an AP and a plurality of stations.

In one example, device 140 (FIG. 1) may be configured to perform one or more operations of the AP, and/or devices 102, 160 and/or 180 (FIG. 1) may be configured to perform one or more operations of one or more of the plurality of stations.

In some demonstrative embodiments, as shown in FIG. 8, the AP may transmit a short feedback trigger frame 802.

In some demonstrative embodiments, short feedback trigger frame 802 may include an indication of a timing of one or more subsequent short feedback trigger frames, for example at a later TxOP.

For example, short feedback trigger frame 802 may include an indication of a timing of one or more short subsequent feedback trigger frames 812.

In some demonstrative embodiments, as shown in FIG. 8, referencing may be performed from short feedback trigger frame 802 to another short feedback trigger frame 812, e.g., where the polling is for the same purpose. For example, short feedback trigger frame 802 may poll for positioning measurements, e.g., as described above, and the short feedback trigger frame 802 may include an indication of one or more subsequent allocations for subsequent trigger frames 812 to poll for position measurements. For example, the referencing from trigger frame 802 to trigger frames 812 may allow "future feedback", for example, by providing a reference to a timing of one or more subsequent, e.g., future, short feedback allocation target transmission times.

In some demonstrative embodiments, MU positioning procedure 800 may allow for an unassociated STA to pick and choose, for example, which instances of the short feedback allocation to use, e.g., for requesting positioning measurement allocation. For example, the unassociated station may choose whether to respond to short feedback trigger frame 802, or to wait and respond to a subsequent short feedback trigger frame 812 at a later time.

In some demonstrative embodiments, indicating the timing of one or more subsequent short feedback trigger frames 812 may enable a station to perform, for example, a flexible scheduling of positioning measurements with multiple APs, which may be deployed, for example, over multiple center frequency allocations, and/or which may not be time synchronized.

In some demonstrative embodiments, a target time of a next short feedback trigger frame 812 for positioning, and/or or a regular target time and interval between short feedback trigger frames for positioning, e.g., if these short feedback trigger frames are transmitted in a regular scheduled manner, may be included, for example, in one or more transmissions, for example, beacons, Fast Initial Link Setup (FILS) discovery frames, and/or any other frame or transmission.

Referring back to FIG. 1, in some demonstrative embodiments, the short feedback based resource allocation procedure described herein, e.g., MU resource allocation procedure 200 (FIG. 2), MU positioning procedure 300 (FIG. 3), MU positioning procedure 500 (FIG. 5), MU positioning procedure 600 (FIG. 6), MU positioning procedure 700 (FIG. 7), and/or MU positioning procedure 800 (FIG. 8), may provide one or more technical advantages, for example, by allowing to re-use a generic resource allocation method, e.g., according to an *IEEE* 802.11*ax Specification*, for example, while not having a specific positioning or dedicated low power resource allocation.

In some demonstrative embodiments, the short feedback based resource allocation procedure described herein may provide one or more technical advantages, for example, by allowing to have a single resource allocation method for both the associated and the unassociated modes, for example, for associated and unassociated stations respectively, e.g., allowing for a lower complexity positioning protocol.

In some demonstrative embodiments, the short feedback based resource allocation procedure described herein may provide one or more technical advantages, for example, by allowing a lower medium overhead, e.g., in comparison to other contention based methods, for example, while supporting a large number of STAs, e.g., positioning STAs for a positioning measurement.

In some demonstrative embodiments, the short feedback based resource allocation procedure described herein may provide one or more technical advantages, for example, by allowing an AP to manage and/or aggregate the type of resource request made, for example, by aggregating multiple positioning STAs to use the same medium resource for positioning purposes, which may be more medium efficient.

In some demonstrative embodiments, the short feedback based resource allocation procedure described herein may provide one or more technical advantages, for example, by allowing to tailor the allocated resource size to the request type, for example, in contrast to a positioning request requiring capability and measurement request parameters, which tend to make these messages larger, and, accordingly, if the allocation ends up unused and/or collided these messages may translate to larger wastage of medium.

In some demonstrative embodiments, the short feedback based resource allocation procedure described herein may provide one or more technical advantages, for example, by allowing unassociated STAs to operate in a pseudo non-deterministic operation, for example, where STAs may pick and choose which instances of short feedback fit their other scheduling constraints, for example, while having minimal impact on the medium wastage, e.g., resources allocated and not eventually used, in comparison to other protocols, e.g., RA based protocols.

Figure 9:
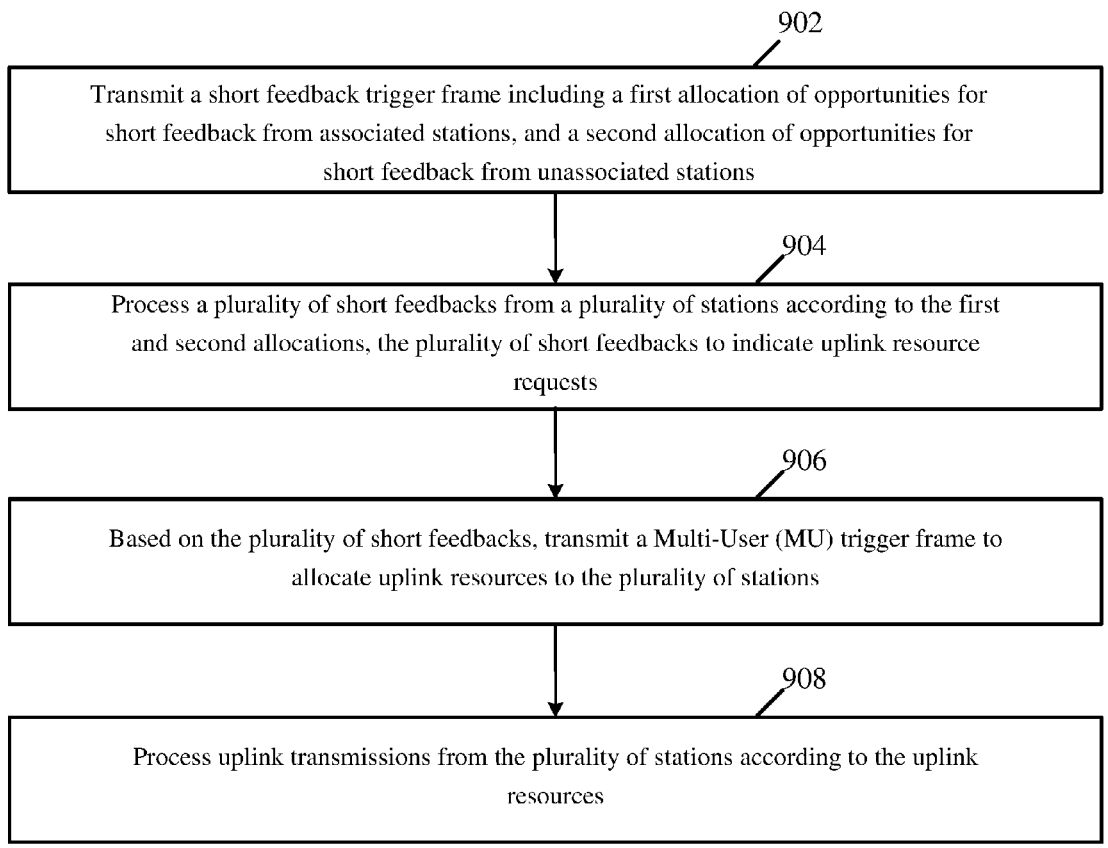
FIG. 9 is a schematic flow-chart illustration of a method of a MU communication according to a MU resource allocation, in accordance with some demonstrative embodiments.

Reference is made to FIG. 9, which schematically illustrates a method of MU communication according to a MU resource allocation, in accordance with some demonstrative embodiments. For example, one or more of the operations of the method of FIG. 9 may be performed by a wireless communication system, e.g., system 100 (FIG. 1); a wireless communication device, e.g., devices 102, 140, 160 and/or 180 (FIG. 1); a controller, e.g., controllers 124 and/or 154 (FIG. 1); a positioning component, e.g., positioning components 117 and/or 157 (FIG. 1); a radio, e.g., radios 114 and/or 144 (FIG. 1); a location estimator, e.g., location estimator 115 (FIG. 1); a message processor, e.g., message processor 128 (FIG. 1) and/or message processor 158 (FIG. 1); a transmitter, e.g., transmitters 118 and/or 148 (FIG. 1); and/or a receiver, e.g., receivers 116 and/or 146 (FIG. 1).

As indicated at block 902, the method may include transmitting a short feedback trigger frame including a first allocation of opportunities for short feedback from associated stations, and a second allocation of opportunities for short feedback from unassociated stations. For example, controller 144 (FIG. 1) may control, cause and/or trigger device 140 (FIG. 1) to transmit the short feedback trigger frame 202 (FIG. 2) including the first allocation of opportunities 204 (FIG. 2) for short feedback from associated stations, and the second allocation of opportunities 206 (FIG. 2) for short feedback from unassociated stations, e.g., as described above.

As indicated at block 904, the method may include processing a plurality of short feedbacks from a plurality of stations according to the first and second allocations, the plurality of short feedbacks to indicate uplink resource requests. For example, device 140 (FIG. 1) may process the plurality of short feedbacks indicating the uplink resource requests from the plurality of stations according to the first and second allocations 204 and 206 (FIG. 2), e.g., as described above.

As indicated at block 906, the method may include, based on the plurality of short feedbacks, transmitting a MU trigger frame to allocate uplink resources to the plurality of stations. For example, controller 144 (FIG. 1) may control, cause and/or trigger device 140 (FIG. 1) to transmit the MU trigger frame 210 (FIG. 2) to allocate the uplink resources to the plurality of stations, e.g., as described above.

As indicated at block 908, the method may include processing uplink transmissions from the plurality of stations according to the uplink resources. For example, device 140 (FIG. 1) may process the uplink transmissions 212 (FIG. 2) from the plurality of stations according to the uplink resources, e.g., as described above.

Figure 10:
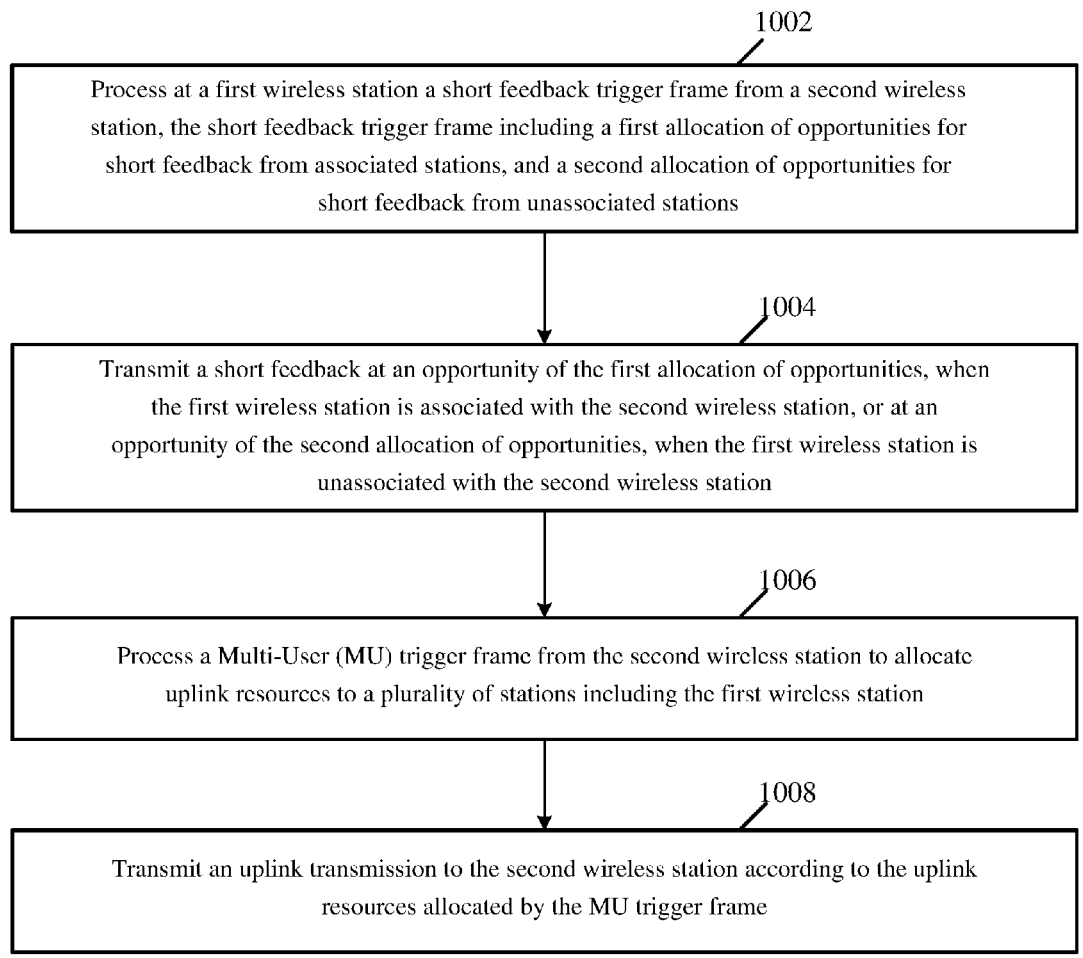
FIG. 10 is a schematic flow-chart illustration of a method of a MU communication according to a MU resource allocation, in accordance with some demonstrative embodiments.

Reference is made to FIG. 10, which schematically illustrates a method of MU communication according to a MU resource allocation, in accordance with some demonstrative embodiments. For example, one or more of the operations of the method of FIG. 10 may be performed by a wireless communication system, e.g., system 100 (FIG. 1); a wireless communication device, e.g., devices 102, 140, 160 and/or 180 (FIG. 1); a controller, e.g., controllers 124 and/or 154 (FIG. 1); an application, e.g., application 125 (FIG. 1); a positioning component, e.g., positioning components 117 and/or 157 (FIG. 1); a location estimator, e.g., location estimator 115 (FIG. 1); a radio, e.g., radios 114 and/or 144 (FIG. 1); a message processor, e.g., message processor 128 (FIG. 1) and/or message processor 158 (FIG. 1); a transmitter, e.g., transmitters 118 and/or 148 (FIG. 1); and/or a receiver, e.g., receivers 116 and/or 146 (FIG. 1).

As indicated at block 1002, the method may include, at a first wireless station, processing a short feedback trigger frame from a second wireless station, the short feedback trigger frame including a first allocation of opportunities for short feedback from associated stations, and a second allocation of opportunities for short feedback from unassociated stations. For example, controller 124 (FIG. 1) may control, cause and/or trigger device 102 (FIG. 1) to process short feedback trigger frame 202 (FIG. 2) from device 140 (FIG. 1) including the first allocation of opportunities for short feedback from associated stations, and the second allocation of opportunities for short feedback from unassociated stations, e.g., as described above.

As indicated at block 1004, the method may include transmitting a short feedback at an opportunity of the first allocation of opportunities, when the first wireless station is associated with the second wireless station, or at an opportunity of the second allocation of opportunities, when the first wireless station is unassociated with the second wireless station. For example, controller 124 (FIG. 1) may control, cause and/or trigger device 102 (FIG. 1) to transmit a short feedback at the opportunity 205 (FIG. 2) of the first allocation of opportunities 204 (FIG. 2), when device 102 (FIG. 1) is associated with device 140 (FIG. 1), or at an opportunity 207 (FIG. 2) of the second allocation of opportunities 206 (FIG. 2), when device 102 (FIG. 1) is unassociated with device 140 (FIG. 1), e.g., as described above.

As indicated at block 1006, the method may include processing a MU trigger frame from the second wireless station to allocate uplink resources to a plurality of stations including the first wireless station. For example, controller 124 (FIG. 1) may control, cause and/or trigger device 102 (FIG. 1) to process MU trigger frame 210 (FIG. 2) from device 140 (FIG. 1) to allocate uplink resources to the plurality of stations including device 102 (FIG. 1), e.g., as described above.

As indicated at block 1008, the method may include transmitting an uplink transmission to the second wireless station according to the uplink resources allocated by the MU trigger frame. For example, controller 124 (FIG. 1) may control, cause and/or trigger device 102 (FIG. 1) to transmit the uplink transmission 213 (FIG. 2) to device 140 (FIG. 1) according to the uplink resources allocated by the MU trigger frame 210 (FIG. 2), e.g., as described above.

Figure 11:
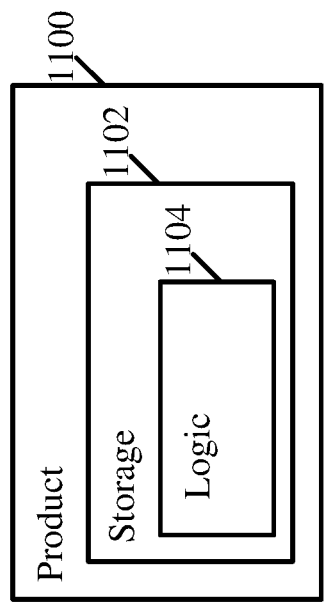
FIG. 11 is a schematic illustration of a product of manufacture, in accordance with some demonstrative embodiments.

Reference is made to FIG. 11, which schematically illustrates a product of manufacture 1100, in accordance with some demonstrative embodiments. Product 1100 may include one or more tangible computer readable non-transitory storage media 1102, which may include computer executable instructions, e.g., implemented by logic 1104, operable to, when executed by at least one computer processor, enable at least one computer processor to implement one or more operations at devices 102, 140, 160 and/or 180 (FIG. 1), radios 114 and/or 144 (FIG. 1), transmitters 118 and/or 148 (FIG. 1), receivers 116 and/or 146 (FIG. 1), controllers 124 and/or 154 (FIG. 1), message processors 128 and/or 158 (FIG. 1), positioning components 117 and/or 157 (FIG. 1), and/or location estimator 115 (FIG. 1), to cause devices 102, 140, 160 and/or 180 (FIG. 1), radios 114 and/or 144 (FIG. 1), transmitters 118 and/or 148 (FIG. 1), receivers 116 and/or 146 (FIG. 1), controllers 124 and/or 154 (FIG. 1), message processors 128 and/or 158 (FIG. 1), positioning components 117 and/or 157 (FIG. 1), and/or location estimator 115 (FIG. 1) to perform one or more operations, and/or to perform one or more operations described above with respect to FIGS. 1, 2, 3, 4, 5, 6, 7, 8, 9 and/or 10, and/or one or more operations described herein. The phrase "computer readable non-transitory storage media" is directed to include all computer-readable media, with the sole exception being a transitory propagating signal.

In some demonstrative embodiments, product 1100 and/or storage media 1102 may include one or more types of computer-readable storage media capable of storing data, including volatile memory, non-volatile memory, removable or non-removable memory, erasable or non-erasable memory, writeable or re-writeable memory, and the like. For example, storage media 1102 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1104 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1104 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry and logic configured to cause a wireless station to transmit a short feedback trigger frame comprising a first allocation of opportunities for short feedback from associated stations, and a second allocation of opportunities for short feedback from unassociated stations; process a plurality of short feedbacks from a plurality of stations according to the first and second allocations, the plurality of short feedbacks to indicate uplink resource requests; based on the plurality of short feedbacks, transmit a Multi-User (MU) trigger frame to allocate uplink resources to the plurality of stations; and process a plurality of uplink transmissions from the plurality of stations according to the uplink resources.

Example 2 includes the subject matter of Example 1, and optionally, wherein the apparatus is configured to cause the wireless station to determine an unassociated identifier (UID) corresponding to an unassociated station from which a short feedback is received at an opportunity of the second allocation of opportunities, the MU trigger frame comprising the UID to identify the unassociated station.

Example 3 includes the subject matter of Example 2, and optionally, wherein the apparatus is configured to cause the wireless station to determine the UID corresponding to the unassociated station based on the opportunity at which the short feedback is received from the unassociated station.

Example 4 includes the subject matter of Example 2 or 3, and optionally, wherein the short feedback trigger frame, the plurality of short feedbacks, the MU trigger frame, and the plurality of uplink transmissions are within a same Transmit Opportunity (TxOP), the UID to expire at an end of the TxOP.

Example 5 includes the subject matter of any one of Examples 2-4, and optionally, wherein the apparatus is configured to cause the wireless station to transmit a MU block acknowledge (BA) to acknowledge receipt of the plurality of uplink transmissions, the MU BA comprising an indication of an expiration time period after which the UID is to expire.

Example 6 includes the subject matter of any one of Examples 1-5, and optionally, wherein the plurality of short feedbacks comprise a short feedback from an associated station, the MU trigger frame comprising an Association Identifier (AID) of the associated station.

Example 7 includes the subject matter of any one of Examples 1-6, and optionally, wherein the short feedback trigger frame comprises a polling type indication to indicate polling for a positioning measurement, the plurality of uplink transmissions comprising a plurality of positioning measurement requests.

Example 8 includes the subject matter of Example 7, and optionally, wherein the apparatus is configured to cause the wireless station to perform a plurality of positioning measurement sequences with the plurality of stations based on the plurality of positioning measurement requests.

Example 9 includes the subject matter of Example 7 or 8, and optionally, wherein the plurality of uplink transmissions comprises Fine Timing Measurement (FTM) requests.

Example 10 includes the subject matter of any one of Examples 1-9, and optionally, wherein the apparatus is configured to cause the wireless station to transmit a MU block acknowledge (BA) to acknowledge receipt of the plurality of uplink transmissions.

Example 11 includes the subject matter of Example 10, and optionally, wherein the MU trigger frame is to allocate an uplink resource based on a short feedback received at an opportunity of the second allocation of opportunities, the MU BA comprises a Media Access Control (MAC) address of an unassociated station from which an uplink transmission is received over the uplink resource.

Example 12 includes the subject matter of any one of Examples 1-11, and optionally, wherein the short feedback trigger frame comprises an indication of a timing of one or more subsequent short feedback trigger frames.

Example 13 includes the subject matter of any one of Examples 1-12, and optionally, wherein the first allocation of opportunities comprises an allocation of non-contention-based opportunities allocated to one or more associated stations.

Example 14 includes the subject matter of any one of Examples 1-13, and optionally, wherein the second allocation of opportunities comprises an allocation of contention-based opportunities.

Example 15 includes the subject matter of any one of Examples 1-14, and optionally, wherein the apparatus is configured to cause the wireless station to allocate the first and second allocations of opportunities according to an orthogonal allocation scheme.

Example 16 includes the subject matter of any one of Examples 1-15, and optionally, wherein the short feedback trigger frame, the plurality of short feedbacks, the MU trigger frame, and the plurality of uplink transmissions are within a same Transmit Opportunity (TxOP).

Example 17 includes the subject matter of any one of Examples 1-16, and optionally, wherein the wireless station comprises an Access Point (AP).

Example 18 includes the subject matter of any one of Examples 1-17, and optionally, comprising a radio, one or more antennas, a memory and a processor.

Example 19 includes a system of wireless communication comprising a wireless station, the wireless station comprising a radio; one or more antennas; a memory; a processor; and a controller configured to cause the wireless station to transmit a short feedback trigger frame comprising a first allocation of opportunities for short feedback from associated stations, and a second allocation of opportunities for short feedback from unassociated stations; process a plurality of short feedbacks from a plurality of stations according to the first and second allocations, the plurality of short feedbacks to indicate uplink resource requests; based on the plurality of short feedbacks, transmit a Multi-User (MU) trigger frame to allocate uplink resources to the plurality of stations; and process a plurality of uplink transmissions from the plurality of stations according to the uplink resources.

Example 20 includes the subject matter of Example 19, and optionally, wherein the controller is configured to cause the wireless station to determine an unassociated identifier (UID) corresponding to an unassociated station from which a short feedback is received at an opportunity of the second allocation of opportunities, the MU trigger frame comprising the UID to identify the unassociated station.

Example 21 includes the subject matter of Example 20, and optionally, wherein the controller is configured to cause the wireless station to determine the UID corresponding to the unassociated station based on the opportunity at which the short feedback is received from the unassociated station.

Example 22 includes the subject matter of Example 20 or 21, and optionally, wherein the short feedback trigger frame, the plurality of short feedbacks, the MU trigger frame, and the plurality of uplink transmissions are within a same Transmit Opportunity (TxOP), the UID to expire at an end of the TxOP.

Example 23 includes the subject matter of any one of Examples 20-22, and optionally, wherein the controller is configured to cause the wireless station to transmit a MU block acknowledge (BA) to acknowledge receipt of the plurality of uplink transmissions, the MU BA comprising an indication of an expiration time period after which the UID is to expire.

Example 24 includes the subject matter of any one of Examples 19-23, and optionally, wherein the plurality of short feedbacks comprise a short feedback from an associated station, the MU trigger frame comprising an Association Identifier (AID) of the associated station.

Example 25 includes the subject matter of any one of Examples 19-24, and optionally, wherein the short feedback trigger frame comprises a polling type indication to indicate polling for a positioning measurement, the plurality of uplink transmissions comprising a plurality of positioning measurement requests.

Example 26 includes the subject matter of Example 25, and optionally, wherein the controller is configured to cause the wireless station to perform a plurality of positioning measurement sequences with the plurality of stations based on the plurality of positioning measurement requests.

Example 27 includes the subject matter of Example 25 or 26, and optionally, wherein the plurality of uplink transmissions comprises Fine Timing Measurement (FTM) requests.

Example 28 includes the subject matter of any one of Examples 19-27, and optionally, wherein the controller is configured to cause the wireless station to transmit a MU block acknowledge (BA) to acknowledge receipt of the plurality of uplink transmissions.

Example 29 includes the subject matter of Example 28, and optionally, wherein the MU trigger frame is to allocate an uplink resource based on a short feedback received at an opportunity of the second allocation of opportunities, the MU BA comprises a Media Access Control (MAC) address of an unassociated station from which an uplink transmission is received over the uplink resource.

Example 30 includes the subject matter of any one of Examples 19-29, and optionally, wherein the short feedback trigger frame comprises an indication of a timing of one or more subsequent short feedback trigger frames.

Example 31 includes the subject matter of any one of Examples 19-30, and optionally, wherein the first allocation of opportunities comprises an allocation of non-contention-based opportunities allocated to one or more associated stations.

Example 32 includes the subject matter of any one of Examples 19-31, and optionally, wherein the second allocation of opportunities comprises an allocation of contention-based opportunities.

Example 33 includes the subject matter of any one of Examples 19-32, and optionally, wherein the controller is configured to cause the wireless station to allocate the first and second allocations of opportunities according to an orthogonal allocation scheme.

Example 34 includes the subject matter of any one of Examples 19-33, and optionally, wherein the short feedback trigger frame, the plurality of short feedbacks, the MU trigger frame, and the plurality of uplink transmissions are within a same Transmit Opportunity (TxOP).

Example 35 includes the subject matter of any one of Examples 19-34, and optionally, wherein the wireless station comprises an Access Point (AP).

Example 36 includes a method to be performed at a wireless station, the method comprising transmitting a short feedback trigger frame comprising a first allocation of opportunities for short feedback from associated stations, and a second allocation of opportunities for short feedback from unassociated stations; processing a plurality of short feedbacks from a plurality of stations according to the first and second allocations, the plurality of short feedbacks to indicate uplink resource requests; based on the plurality of short feedbacks, transmitting a Multi-User (MU) trigger frame to allocate uplink resources to the plurality of stations; and processing a plurality of uplink transmissions from the plurality of stations according to the uplink resources.

Example 37 includes the subject matter of Example 36, and optionally, comprising determining an unassociated identifier (UID) corresponding to an unassociated station from which a short feedback is received at an opportunity of the second allocation of opportunities, the MU trigger frame comprising the UID to identify the unassociated station.

Example 38 includes the subject matter of Example 37, and optionally, comprising determining the UID corresponding to the unassociated station based on the opportunity at which the short feedback is received from the unassociated station.

Example 39 includes the subject matter of Example 37 or 38, and optionally, wherein the short feedback trigger frame, the plurality of short feedbacks, the MU trigger frame, and the plurality of uplink transmissions are within a same Transmit Opportunity (TxOP), the UID to expire at an end of the TxOP.

Example 40 includes the subject matter of any one of Examples 37-39, and optionally, comprising transmitting a MU block acknowledge (BA) to acknowledge receipt of the plurality of uplink transmissions, the MU BA comprising an indication of an expiration time period after which the UID is to expire.

Example 41 includes the subject matter of any one of Examples 36-40, and optionally, wherein the plurality of short feedbacks comprise a short feedback from an associated station, the MU trigger frame comprising an Association Identifier (AID) of the associated station.

Example 42 includes the subject matter of any one of Examples 36-41, and optionally, wherein the short feedback trigger frame comprises a polling type indication to indicate polling for a positioning measurement, the plurality of uplink transmissions comprising a plurality of positioning measurement requests.

Example 43 includes the subject matter of Example 42, and optionally, comprising performing a plurality of positioning measurement sequences with the plurality of stations based on the plurality of positioning measurement requests.

Example 44 includes the subject matter of Example 42 or 43, and optionally, wherein the plurality of uplink transmissions comprises Fine Timing Measurement (FTM) requests.

Example 45 includes the subject matter of any one of Examples 36-44, and optionally, comprising transmitting a MU block acknowledge (BA) to acknowledge receipt of the plurality of uplink transmissions.

Example 46 includes the subject matter of Example 45, and optionally, wherein the MU trigger frame is to allocate an uplink resource based on a short feedback received at an opportunity of the second allocation of opportunities, the MU BA comprises a Media Access Control (MAC) address of an unassociated station from which an uplink transmission is received over the uplink resource.

Example 47 includes the subject matter of any one of Examples 36-46, and optionally, wherein the short feedback trigger frame comprises an indication of a timing of one or more subsequent short feedback trigger frames.

Example 48 includes the subject matter of any one of Examples 36-47, and optionally, wherein the first allocation of opportunities comprises an allocation of non-contention-based opportunities allocated to one or more associated stations.

Example 49 includes the subject matter of any one of Examples 36-48, and optionally, wherein the second allocation of opportunities comprises an allocation of contention-based opportunities.

Example 50 includes the subject matter of any one of Examples 36-49, and optionally, comprising allocating the first and second allocations of opportunities according to an orthogonal allocation scheme.

Example 51 includes the subject matter of any one of Examples 36-50, and optionally, wherein the short feedback trigger frame, the plurality of short feedbacks, the MU trigger frame, and the plurality of uplink transmissions are within a same Transmit Opportunity (TxOP).

Example 52 includes the subject matter of any one of Examples 36-51, and optionally, wherein the wireless station comprises an Access Point (AP).

Example 53 includes a product including one or more tangible computer-readable non-transitory storage media comprising computer-executable instructions operable to, when executed by at least one computer processor, enable the at least one computer processor to cause a wireless station to transmit a short feedback trigger frame comprising a first allocation of opportunities for short feedback from associated stations, and a second allocation of opportunities for short feedback from unassociated stations; process a plurality of short feedbacks from a plurality of stations according to the first and second allocations, the plurality of short feedbacks to indicate uplink resource requests; based on the plurality of short feedbacks, transmit a Multi-User (MU) trigger frame to allocate uplink resources to the plurality of stations; and process a plurality of uplink transmissions from the plurality of stations according to the uplink resources.

Example 54 includes the subject matter of Example 53, and optionally, wherein the instructions, when executed, cause the wireless station to determine an unassociated identifier (UID) corresponding to an unassociated station from which a short feedback is received at an opportunity of the second allocation of opportunities, the MU trigger frame comprising the UID to identify the unassociated station.

Example 55 includes the subject matter of Example 54, and optionally, wherein the instructions, when executed, cause the wireless station to determine the UID corresponding to the unassociated station based on the opportunity at which the short feedback is received from the unassociated station.

Example 56 includes the subject matter of Example 54 or 55, and optionally, wherein the short feedback trigger frame, the plurality of short feedbacks, the MU trigger frame, and the plurality of uplink transmissions are within a same Transmit Opportunity (TxOP), the UID to expire at an end of the TxOP.

Example 57 includes the subject matter of any one of Examples 54-56, and optionally, wherein the instructions, when executed, cause the wireless station to transmit a MU block acknowledge (BA) to acknowledge receipt of the plurality of uplink transmissions, the MU BA comprising an indication of an expiration time period after which the UID is to expire.

Example 58 includes the subject matter of any one of Examples 53-57, and optionally, wherein the plurality of short feedbacks comprise a short feedback from an associated station, the MU trigger frame comprising an Association Identifier (AID) of the associated station.

Example 59 includes the subject matter of any one of Examples 53-58, and optionally, wherein the short feedback trigger frame comprises a polling type indication to indicate polling for a positioning measurement, the plurality of uplink transmissions comprising a plurality of positioning measurement requests.

Example 60 includes the subject matter of Example 59, and optionally, wherein the instructions, when executed, cause the wireless station to perform a plurality of positioning measurement sequences with the plurality of stations based on the plurality of positioning measurement requests.

Example 61 includes the subject matter of Example 59 or 60, and optionally, wherein the plurality of uplink transmissions comprises Fine Timing Measurement (FTM) requests.

Example 62 includes the subject matter of any one of Examples 53-61, and optionally, wherein the instructions, when executed, cause the wireless station to transmit a MU block acknowledge (BA) to acknowledge receipt of the plurality of uplink transmissions.

Example 63 includes the subject matter of Example 62, and optionally, wherein the MU trigger frame is to allocate an uplink resource based on a short feedback received at an opportunity of the second allocation of opportunities, the MU BA comprises a Media Access Control (MAC) address of an unassociated station from which an uplink transmission is received over the uplink resource.

Example 64 includes the subject matter of any one of Examples 53-63, and optionally, wherein the short feedback trigger frame comprises an indication of a timing of one or more subsequent short feedback trigger frames.

Example 65 includes the subject matter of any one of Examples 53-64, and optionally, wherein the first allocation of opportunities comprises an allocation of non-contention-based opportunities allocated to one or more associated stations.

Example 66 includes the subject matter of any one of Examples 53-65, and optionally, wherein the second allocation of opportunities comprises an allocation of contention-based opportunities.

Example 67 includes the subject matter of any one of Examples 53-66, and optionally, wherein the instructions, when executed, cause the wireless stations to allocate the first and second allocations of opportunities according to an orthogonal allocation scheme.

Example 68 includes the subject matter of any one of Examples 53-67, and optionally, wherein the short feedback trigger frame, the plurality of short feedbacks, the MU trigger frame, and the plurality of uplink transmissions are within a same Transmit Opportunity (TxOP).

Example 69 includes the subject matter of any one of Examples 53-68, and optionally, wherein the wireless station comprises an Access Point (AP).

Example 70 includes an apparatus of wireless communication by a wireless station, the apparatus comprising means for transmitting a short feedback trigger frame comprising a first allocation of opportunities for short feedback from associated stations, and a second allocation of opportunities for short feedback from unassociated stations; means for processing a plurality of short feedbacks from a plurality of stations according to the first and second allocations, the plurality of short feedbacks to indicate uplink resource requests; means for, based on the plurality of short feedbacks, transmitting a Multi-User (MU) trigger frame to allocate uplink resources to the plurality of stations; and means for processing the plurality of uplink transmissions from the plurality of stations according to the uplink resources.

Example 71 includes the subject matter of Example 70, and optionally, comprising means for determining an unassociated identifier (UID) corresponding to an unassociated station from which a short feedback is received at an opportunity of the second allocation of opportunities, the MU trigger frame comprising the UID to identify the unassociated station.

Example 72 includes the subject matter of Example 71, and optionally, comprising means for determining the UID corresponding to the unassociated station based on the opportunity at which the short feedback is received from the unassociated station.

Example 73 includes the subject matter of Example 71 or 72, and optionally, wherein the short feedback trigger frame, the plurality of short feedbacks, the MU trigger frame, and the plurality of uplink transmissions are within a same Transmit Opportunity (TxOP), the UID to expire at an end of the TxOP.

Example 74 includes the subject matter of any one of Examples 71-73, and optionally, comprising means for transmitting a MU block acknowledge (BA) to acknowledge receipt of the plurality of uplink transmissions, the MU BA comprising an indication of an expiration time period after which the UID is to expire.

Example 75 includes the subject matter of any one of Examples 70-74, and optionally, wherein the plurality of short feedbacks comprise a short feedback from an associated station, the MU trigger frame comprising an Association Identifier (AID) of the associated station.

Example 76 includes the subject matter of any one of Examples 70-75, and optionally, wherein the short feedback trigger frame comprises a polling type indication to indicate polling for a positioning measurement, the plurality of uplink transmissions comprising a plurality of positioning measurement requests.

Example 77 includes the subject matter of Example 76, and optionally, comprising means for performing a plurality of positioning measurement sequences with the plurality of stations based on the plurality of positioning measurement requests.

Example 78 includes the subject matter of Example 76 or 77, and optionally, wherein the plurality of uplink transmissions comprises Fine Timing Measurement (FTM) requests.

Example 79 includes the subject matter of any one of Examples 70-78, and optionally, comprising means for transmitting a MU block acknowledge (BA) to acknowledge receipt of the plurality of uplink transmissions.

Example 80 includes the subject matter of Example 79, and optionally, wherein the MU trigger frame is to allocate an uplink resource based on a short feedback received at an opportunity of the second allocation of opportunities, the MU BA comprises a Media Access Control (MAC) address of an unassociated station from which an uplink transmission is received over the uplink resource.

Example 81 includes the subject matter of any one of Examples 70-80, and optionally, wherein the short feedback trigger frame comprises an indication of a timing of one or more subsequent short feedback trigger frames.

Example 82 includes the subject matter of any one of Examples 70-81, and optionally, wherein the first allocation of opportunities comprises an allocation of non-contention-based opportunities allocated to one or more associated stations.

Example 83 includes the subject matter of any one of Examples 70-82, and optionally, wherein the second allocation of opportunities comprises an allocation of contention-based opportunities.

Example 84 includes the subject matter of any one of Examples 70-83, and optionally, comprising means for allocating the first and second allocations of opportunities according to an orthogonal allocation scheme.

Example 85 includes the subject matter of any one of Examples 70-84, and optionally, wherein the short feedback trigger frame, the plurality of short feedbacks, the MU trigger frame, and the plurality of uplink transmissions are within a same Transmit Opportunity (TxOP).

Example 86 includes the subject matter of any one of Examples 70-85, and optionally, wherein the wireless station comprises an Access Point (AP).

Example 87 includes an apparatus comprising circuitry and logic configured to cause a first wireless station to process a short feedback trigger frame from a second wireless station, the short feedback trigger frame comprising a first allocation of opportunities for short feedback from associated stations, and a second allocation of opportunities for short feedback from unassociated stations; transmit a short feedback at an opportunity of the first allocation of opportunities, when the first wireless station is associated with the second wireless station, or at an opportunity of the second allocation of opportunities, when the first wireless station is unassociated with the second wireless station; process a Multi-User (MU) trigger frame from the second wireless station to allocate uplink resources to a plurality of stations comprising the first wireless station; and transmit an uplink transmission to the second wireless station according to the uplink resources allocated by the MU trigger frame.

Example 88 includes the subject matter of Example 87, and optionally, wherein the MU trigger frame comprises an unassociated identifier (UID) to identify the first wireless station, when the first wireless station is unassociated with the second wireless station.

Example 89 includes the subject matter of Example 88, and optionally, wherein the UID is based on the opportunity of the second allocation of opportunities, which is used for the short feedback.

Example 90 includes the subject matter of Example 88 or 89, and optionally, wherein the short feedback trigger frame, the short feedback, the MU trigger frame, and the uplink transmission are within a same Transmit Opportunity (TxOP), the UID to expire at an end of the TxOP.

Example 91 includes the subject matter of any one of Examples 88-90, and optionally, wherein the apparatus is configured to cause the first wireless station to process a MU block acknowledge (BA) to acknowledge receipt of the uplink transmission, the MU BA comprising an indication of an expiration time period after which the UID is to expire.

Example 92 includes the subject matter of any one of Examples 87-91, and optionally, wherein the MU trigger frame comprises an associated identifier (AID) to identify the first wireless station, when the first wireless station is associated with the second wireless station.

Example 93 includes the subject matter of any one of Examples 87-92, and optionally, wherein the short feedback trigger frame comprises a polling type indication to indicate polling for a positioning measurement, the uplink transmission comprising a positioning measurement request.

Example 94 includes the subject matter of Example 93, and optionally, wherein the apparatus is configured to cause the first wireless station to perform a positioning measurement sequence with the second wireless station based on the measurement request.

Example 95 includes the subject matter of Example 93 or 94, and optionally, wherein the uplink transmission comprises a Fine Timing Measurement (FTM) request.

Example 96 includes the subject matter of any one of Examples 87-95, and optionally, wherein the apparatus is configured to cause the first wireless station to process a MU block acknowledge (BA) from the second wireless station to acknowledge receipt of the uplink transmission.

Example 97 includes the subject matter of Example 96, and optionally, wherein the uplink transmission comprises a Media Access Control (MAC) address of the first wireless station, and the MU BA comprises the MAC address of the first wireless station.

Example 98 includes the subject matter of any one of Examples 87-97, and optionally, wherein the short feedback trigger frame comprises an indication of a timing of one or more subsequent short feedback trigger frames.

Example 99 includes the subject matter of any one of Examples 87-98, and optionally, wherein the first allocation of opportunities comprises an allocation of non-contention-based opportunities allocated to one or more associated stations.

Example 100 includes the subject matter of any one of Examples 87-99, and optionally, wherein the second allocation of opportunities comprises an allocation of contention-based opportunities.

Example 101 includes the subject matter of any one of Examples 87-100, and optionally, wherein the first and second allocations of opportunities are according to an orthogonal allocation scheme.

Example 102 includes the subject matter of any one of Examples 87-101, and optionally, wherein the short feedback trigger frame, the short feedback, the MU trigger frame, and the uplink transmission are within a same Transmit Opportunity (TxOP).

Example 103 includes the subject matter of any one of Examples 87-102, and optionally, wherein the first wireless station comprises a mobile device.

Example 104 includes the subject matter of any one of Examples 87-103, and optionally, comprising a radio, one or more antennas, a memory and a processor.

Example 105 includes a system of wireless communication comprising a first wireless station, the first wireless station comprising a radio; one or more antennas; a memory; a processor; and a controller configured to cause the first wireless station to process a short feedback trigger frame from a second wireless station, the short feedback trigger frame comprising a first allocation of opportunities for short feedback from associated stations, and a second allocation of opportunities for short feedback from unassociated stations; transmit a short feedback at an opportunity of the first allocation of opportunities, when the first wireless station is associated with the second wireless station, or at an opportunity of the second allocation of opportunities, when the first wireless station is unassociated with the second wireless station; process a Multi-User (MU) trigger frame from the second wireless station to allocate uplink resources to a plurality of stations comprising the first wireless station; and transmit an uplink transmission to the second wireless station according to the uplink resources allocated by the MU trigger frame.

Example 106 includes the subject matter of Example 105, and optionally, wherein the MU trigger frame comprises an unassociated identifier (UID) to identify the first wireless station, when the first wireless station is unassociated with the second wireless station.

Example 107 includes the subject matter of Example 106, and optionally, wherein the UID is based on the opportunity of the second allocation of opportunities, which is used for the short feedback.

Example 108 includes the subject matter of Example 106 or 107, and optionally, wherein the short feedback trigger frame, the short feedback, the MU trigger frame, and the uplink transmission are within a same Transmit Opportunity (TxOP), the UID to expire at an end of the TxOP.

Example 109 includes the subject matter of any one of Examples 106-108, and optionally, wherein the controller is configured to cause the first wireless station to process a MU block acknowledge (BA) to acknowledge receipt of the uplink transmission, the MU BA comprising an indication of an expiration time period after which the UID is to expire.

Example 110 includes the subject matter of any one of Examples 105-109, and optionally, wherein the MU trigger frame comprises an associated identifier (AID) to identify the first wireless station, when the first wireless station is associated with the second wireless station.

Example 111 includes the subject matter of any one of Examples 105-110, and optionally, wherein the short feedback trigger frame comprises a polling type indication to indicate polling for a positioning measurement, the uplink transmission comprising a positioning measurement request.

Example 112 includes the subject matter of Example 111, and optionally, wherein the controller is configured to cause the first wireless station to perform a positioning measurement sequence with the second wireless station based on the measurement request.

Example 113 includes the subject matter of Example 111 or 112, and optionally, wherein the uplink transmission comprises a Fine Timing Measurement (FTM) request.

Example 114 includes the subject matter of any one of Examples 105-113, and optionally, wherein the controller is configured to cause the first wireless station to process a MU block acknowledge (BA) from the second wireless station to acknowledge receipt of the uplink transmission.

Example 115 includes the subject matter of Example 114, and optionally, wherein the uplink transmission comprises a Media Access Control (MAC) address of the first wireless station, and the MU BA comprises the MAC address of the first wireless station.

Example 116 includes the subject matter of any one of Examples 105-115, and optionally, wherein the short feedback trigger frame comprises an indication of a timing of one or more subsequent short feedback trigger frames.

Example 117 includes the subject matter of any one of Examples 105-116, and optionally, wherein the first allocation of opportunities comprises an allocation of non-contention-based opportunities allocated to one or more associated stations.

Example 118 includes the subject matter of any one of Examples 105-117, and optionally, wherein the second allocation of opportunities comprises an allocation of contention-based opportunities.

Example 119 includes the subject matter of any one of Examples 105-118, and optionally, wherein the first and second allocations of opportunities are according to an orthogonal allocation scheme.

Example 120 includes the subject matter of any one of Examples 105-119, and optionally, wherein the short feedback trigger frame, the short feedback, the MU trigger frame, and the uplink transmission are within a same Transmit Opportunity (TxOP).

Example 121 includes the subject matter of any one of Examples 105-120, and optionally, wherein the first wireless station comprises a mobile device.

Example 122 includes a method to be performed at a first wireless station, the method comprising processing a short feedback trigger frame from a second wireless station, the short feedback trigger frame comprising a first allocation of opportunities for short feedback from associated stations, and a second allocation of opportunities for short feedback from unassociated stations; transmitting a short feedback at an opportunity of the first allocation of opportunities, when the first wireless station is associated with the second wireless station, or at an opportunity of the second allocation of opportunities, when the first wireless station is unassociated with the second wireless station; processing a Multi-User (MU) trigger frame from the second wireless station to allocate uplink resources to a plurality of stations comprising the first wireless station; and transmitting an uplink transmission to the second wireless station according to the uplink resources allocated by the MU trigger frame.

Example 123 includes the subject matter of Example 122, and optionally, wherein the MU trigger frame comprises an unassociated identifier (UID) to identify the first wireless station, when the first wireless station is unassociated with the second wireless station.

Example 124 includes the subject matter of Example 123, and optionally, wherein the UID is based on the opportunity of the second allocation of opportunities, which is used for the short feedback.

Example 125 includes the subject matter of Example 123 or 124, and optionally, wherein the short feedback trigger frame, the short feedback, the MU trigger frame, and the uplink transmission are within a same Transmit Opportunity (TxOP), the UID to expire at an end of the TxOP.

Example 126 includes the subject matter of any one of Examples 123-125, and optionally, comprising processing a MU block acknowledge (BA) to acknowledge receipt of the uplink transmission, the MU BA comprising an indication of an expiration time period after which the UID is to expire.

Example 127 includes the subject matter of any one of Examples 122-126, and optionally, wherein the MU trigger frame comprises an associated identifier (AID) to identify the first wireless station, when the first wireless station is associated with the second wireless station.

Example 128 includes the subject matter of any one of Examples 122-127, and optionally, wherein the short feedback trigger frame comprises a polling type indication to indicate polling for a positioning measurement, the uplink transmission comprising a positioning measurement request.

Example 129 includes the subject matter of Example 128, and optionally, comprising performing a positioning measurement sequence with the second wireless station based on the measurement request.

Example 130 includes the subject matter of Example 128 or 129, and optionally, wherein the uplink transmission comprises a Fine Timing Measurement (FTM) request.

Example 131 includes the subject matter of any one of Examples 122-130, and optionally, comprising processing a MU block acknowledge (BA) from the second wireless station to acknowledge receipt of the uplink transmission.

Example 132 includes the subject matter of Example 131, and optionally, wherein the uplink transmission comprises a Media Access Control (MAC) address of the first wireless station, and the MU BA comprises the MAC address of the first wireless station.

Example 133 includes the subject matter of any one of Examples 122-132, and optionally, wherein the short feedback trigger frame comprises an indication of a timing of one or more subsequent short feedback trigger frames.

Example 134 includes the subject matter of any one of Examples 122-133, and optionally, wherein the first allocation of opportunities comprises an allocation of non-contention-based opportunities allocated to one or more associated stations.

Example 135 includes the subject matter of any one of Examples 122-134, and optionally, wherein the second allocation of opportunities comprises an allocation of contention-based opportunities.

Example 136 includes the subject matter of any one of Examples 122-135, and optionally, wherein the first and second allocations of opportunities are according to an orthogonal allocation scheme.

Example 137 includes the subject matter of any one of Examples 122-136, and optionally, wherein the short feedback trigger frame, the short feedback, the MU trigger frame, and the uplink transmission are within a same Transmit Opportunity (TxOP).

Example 138 includes the subject matter of any one of Examples 122-137, and optionally, wherein the first wireless station comprises a mobile device.

Example 139 includes a product including one or more tangible computer-readable non-transitory storage media comprising computer-executable instructions operable to, when executed by at least one computer processor, enable the at least one computer processor to cause a first wireless station to process a short feedback trigger frame from a second wireless station, the short feedback trigger frame comprising a first allocation of opportunities for short feedback from associated stations, and a second allocation of opportunities for short feedback from unassociated stations; transmit a short feedback at an opportunity of the first allocation of opportunities, when the first wireless station is associated with the second wireless station, or at an opportunity of the second allocation of opportunities, when the first wireless station is unassociated with the second wireless station; process a Multi-User (MU) trigger frame from the second wireless station to allocate uplink resources to a plurality of stations comprising the first wireless station; and transmit an uplink transmission to the second wireless station according to the uplink resources allocated by the MU trigger frame.

Example 140 includes the subject matter of Example 139, and optionally, wherein the MU trigger frame comprises an unassociated identifier (UID) to identify the first wireless station, when the first wireless station is unassociated with the second wireless station.

Example 141 includes the subject matter of Example 140, and optionally, wherein the UID is based on the opportunity of the second allocation of opportunities, which is used for the short feedback.

Example 142 includes the subject matter of Example 140 or 141, and optionally, wherein the short feedback trigger frame, the short feedback, the MU trigger frame, and the uplink transmission are within a same Transmit Opportunity (TxOP), the UID to expire at an end of the TxOP.

Example 143 includes the subject matter of any one of Examples 140-142, and optionally, wherein the instructions, when executed, cause the first wireless station to process a MU block acknowledge (BA) to acknowledge receipt of the uplink transmission, the MU BA comprising an indication of an expiration time period after which the UID is to expire.

Example 144 includes the subject matter of any one of Examples 139-143, and optionally, wherein the MU trigger frame comprises an associated identifier (AID) to identify the first wireless station, when the first wireless station is associated with the second wireless station.

Example 145 includes the subject matter of any one of Examples 139-144, and optionally, wherein the short feedback trigger frame comprises a polling type indication to indicate polling for a positioning measurement, the uplink transmission comprising a positioning measurement request.

Example 146 includes the subject matter of Example 145, and optionally, wherein the instructions, when executed, cause the first wireless station to perform a positioning measurement sequence with the second wireless station based on the measurement request.

Example 147 includes the subject matter of Example 145 or 146, and optionally, wherein the uplink transmission comprises a Fine Timing Measurement (FTM) request.

Example 148 includes the subject matter of any one of Examples 139-147, and optionally, wherein the instructions, when executed, cause the first wireless station to process a MU block acknowledge (BA) from the second wireless station to acknowledge receipt of the uplink transmission.

Example 149 includes the subject matter of Example 148, and optionally, wherein the uplink transmission comprises a Media Access Control (MAC) address of the first wireless station, and the MU BA comprises the MAC address of the first wireless station.

Example 150 includes the subject matter of any one of Examples 139-149, and optionally, wherein the short feedback trigger frame comprises an indication of a timing of one or more subsequent short feedback trigger frames.

Example 151 includes the subject matter of any one of Examples 139-150, and optionally, wherein the first allocation of opportunities comprises an allocation of non-contention-based opportunities allocated to one or more associated stations.

Example 152 includes the subject matter of any one of Examples 139-151, and optionally, wherein the second allocation of opportunities comprises an allocation of contention-based opportunities.

Example 153 includes the subject matter of any one of Examples 139-152, and optionally, wherein the first and second allocations of opportunities are allocated to an orthogonal allocation scheme.

Example 154 includes the subject matter of any one of Examples 139-153, and optionally, wherein the short feedback trigger frame, the short feedback, the MU trigger frame, and the uplink transmission are within a same Transmit Opportunity (TxOP).

Example 155 includes the subject matter of any one of Examples 139-154, and optionally, wherein the first wireless station comprises a mobile device.

Example 156 includes an apparatus of wireless communication by a first wireless station, the apparatus comprising means for processing a short feedback trigger frame from a second wireless station, the short feedback trigger frame comprising a first allocation of opportunities for short feedback from associated stations, and a second allocation of opportunities for short feedback from unassociated stations; means for transmitting a short feedback at an opportunity of the first allocation of opportunities, when the first wireless station is associated with the second wireless station, or at an opportunity of the second allocation of opportunities, when the first wireless station is unassociated with the second wireless station; means for processing a Multi-User (MU) trigger frame from the second wireless station to allocate uplink resources to a plurality of stations comprising the first wireless station; and means for transmitting an uplink transmission to the second wireless station according to the uplink resources allocated by the MU trigger frame.

Example 157 includes the subject matter of Example 156, and optionally, wherein the MU trigger frame comprises an unassociated identifier (UID) to identify the first wireless station, when the first wireless station is unassociated with the second wireless station.

Example 158 includes the subject matter of Example 157, and optionally, wherein the UID is based on the opportunity of the second allocation of opportunities, which is used for the short feedback.

Example 159 includes the subject matter of Example 157 or 158, and optionally, wherein the short feedback trigger frame, the short feedback, the MU trigger frame, and the uplink transmission are within a same Transmit Opportunity (TxOP), the UID to expire at an end of the TxOP.

Example 160 includes the subject matter of any one of Examples 157-159, and optionally, comprising means for processing a MU block acknowledge (BA) to acknowledge receipt of the uplink transmission, the MU BA comprising an indication of an expiration time period after which the UID is to expire.

Example 161 includes the subject matter of any one of Examples 156-160, and optionally, wherein the MU trigger frame comprises an associated identifier (AID) to identify the first wireless station, when the first wireless station is associated with the second wireless station.

Example 162 includes the subject matter of any one of Examples 156-161, and optionally, wherein the short feedback trigger frame comprises a polling type indication to indicate polling for a positioning measurement, the uplink transmission comprising a positioning measurement request.

Example 163 includes the subject matter of Example 162, and optionally, comprising means for performing a positioning measurement sequence with the second wireless station based on the measurement request.

Example 164 includes the subject matter of Example 162 or 163, and optionally, wherein the uplink transmission comprises a Fine Timing Measurement (FTM) request.

Example 165 includes the subject matter of any one of Examples 156-164, and optionally, comprising means for processing a MU block acknowledge (BA) from the second wireless station to acknowledge receipt of the uplink transmission.

Example 166 includes the subject matter of Example 165, and optionally, wherein the uplink transmission comprises a Media Access Control (MAC) address of the first wireless station, and the MU BA comprises the MAC address of the first wireless station.

Example 167 includes the subject matter of any one of Examples 156-166, and optionally, wherein the short feedback trigger frame comprises an indication of a timing of one or more subsequent short feedback trigger frames.

Example 168 includes the subject matter of any one of Examples 156-167, and optionally, wherein the first allocation of opportunities comprises an allocation of non-contention-based opportunities allocated to one or more associated stations.

Example 169 includes the subject matter of any one of Examples 156-168, and optionally, wherein the second allocation of opportunities comprises an allocation of contention-based opportunities.

Example 170 includes the subject matter of any one of Examples 156-169, and optionally, wherein the first and second allocations of opportunities are according to an orthogonal allocation scheme.

Example 171 includes the subject matter of any one of Examples 156-170, and optionally, wherein the short feedback trigger frame, the short feedback, the MU trigger frame, and the uplink transmission are within a same Transmit Opportunity (TxOP).

Example 172 includes the subject matter of any one of Examples 156-171, and optionally, wherein the first wireless station comprises a mobile device.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising circuitry and logic configured to cause a wireless station to:
   transmit a short feedback trigger frame comprising a polling type indication to indicate polling for a Multi-User (MU) positioning measurement, the short feedback trigger frame comprising a first allocation of opportunities for short feedback from associated stations, and a second allocation of opportunities for short feedback from unassociated stations;
   process a plurality of short feedbacks from a plurality of stations according to the first and second allocations, the plurality of short feedbacks to indicate uplink resource requests for the MU positioning measurement;
   determine an unassociated identifier (UID) corresponding to an unassociated station from which a short feedback is received at an opportunity of the second allocation of opportunities;
   based on the plurality of short feedbacks, transmit a MU trigger frame to allocate uplink resources to the plurality of stations, the MU trigger frame comprising the UID to identify the unassociated station; and
   process a plurality of uplink transmissions comprising a plurality of positioning measurement requests from the plurality of stations according to the uplink resources.

2. The apparatus of claim 1 configured to cause the wireless station to allocate the first and second allocations of opportunities according to an orthogonal allocation scheme.

3. The apparatus of claim 1 configured to cause the wireless station to determine the UID corresponding to the unassociated station based on the opportunity at which the short feedback is received from the unassociated station.

4. The apparatus of claim 1, wherein the short feedback trigger frame, the plurality of short feedbacks, the MU trigger frame, and the plurality of uplink transmissions are within a same Transmit Opportunity (TxOP), the UID to expire at an end of the TxOP.

5. The apparatus of claim 1 configured to cause the wireless station to transmit a MU block acknowledge (BA) to acknowledge receipt of the plurality of uplink transmissions, said MU BA comprising an indication of an expiration time period after which said UID is to expire.

6. The apparatus of claim 1, wherein the plurality of short feedbacks comprises another short feedback from an associated station, the MU trigger frame comprising an Association Identifier (AID) of the associated station.

7. The apparatus of claim 1, wherein the wireless station comprises an Access Point (AP).

8. The apparatus of claim 1 configured to cause the wireless station to perform a plurality of positioning measurement sequences with the plurality of stations based on the plurality of positioning measurement requests.

9. The apparatus of claim 1, wherein the plurality of uplink transmissions comprises Fine Timing Measurement (FTM) requests.

10. The apparatus of claim 1 configured to cause the wireless station to transmit a MU block acknowledge (BA) to acknowledge receipt of the plurality of uplink transmissions.

11. The apparatus of claim 10, wherein the MU trigger frame is to allocate an uplink resource based on the short feedback received at the opportunity of the second allocation of opportunities, the MU BA comprises a Media Access Control (MAC) address of the unassociated station from which an uplink transmission is received over the uplink resource.

12. The apparatus of claim 1, wherein the short feedback trigger frame comprises an indication of a timing of one or more subsequent short feedback trigger frames.

13. The apparatus of claim 1, wherein the first allocation of opportunities comprises an allocation of non-contention-based opportunities allocated to one or more associated stations.

14. The apparatus of claim 1, wherein the second allocation of opportunities comprises an allocation of contention-based opportunities.

15. The apparatus of claim 1, wherein the short feedback trigger frame, the plurality of short feedbacks, the MU trigger frame, and the plurality of uplink transmissions are within a same Transmit Opportunity (TxOP).

16. The apparatus of claim 1 comprising a radio, one or more antennas, a memory and a processor.

17. A product including one or more tangible computer-readable non-transitory storage media comprising computer-executable instructions operable to, when executed by at least one processor, enable the at least one processor to cause a wireless station to:
  transmit a short feedback trigger frame comprising a polling type indication to indicate polling for a Multi-User (MU) positioning measurement, the short feedback trigger frame comprising a first allocation of opportunities for short feedback from associated stations, and a second allocation of opportunities for short feedback from unassociated stations;
  process a plurality of short feedbacks from a plurality of stations according to the first and second allocations, the plurality of short feedbacks to indicate uplink resource requests for the MU positioning measurement;
  determine an unassociated identifier (UID) corresponding to an unassociated station from which a short feedback is received at an opportunity of the second allocation of opportunities;
  based on the plurality of short feedbacks, transmit a MU trigger frame to allocate uplink resources to the plurality of stations, the MU trigger frame comprising the UID to identify the unassociated station; and
  process a plurality of uplink transmissions comprising a plurality of positioning measurement requests from the plurality of stations according to the uplink resources.

18. The product of claim 17, wherein the instructions, when executed, cause the wireless station to determine the UID corresponding to the unassociated station based on the opportunity at which the short feedback is received from the unassociated station.

19. An apparatus comprising circuitry and logic configured to cause a first wireless station to:
  process a short feedback trigger frame from a second wireless station, the short feedback trigger frame comprising a polling type indication to indicate polling for a Multi-User (MU) positioning measurement, the short feedback trigger frame comprising a first allocation of opportunities for short feedback from associated stations, and a second allocation of opportunities for short feedback from unassociated stations;
  transmit a short feedback at an opportunity of the first allocation of opportunities, when the first wireless station is associated with the second wireless station, or at an opportunity of the second allocation of opportunities, when the first wireless station is unassociated with the second wireless station, the short feedback to indicate an uplink resource request for the MU positioning measurement;
  process a MU trigger frame from the second wireless station to allocate uplink resources to a plurality of stations comprising the first wireless station, the MU trigger frame comprises an unassociated identifier (UID) to identify the first wireless station when the first wireless station is unassociated with the second wireless station; and
  transmit an uplink transmission comprising a positioning measurement request to the second wireless station according to the uplink resources allocated by the MU trigger frame.

20. The apparatus of claim 19, wherein the first allocation of opportunities comprises an allocation of non-contention-based opportunities allocated to one or more associated stations, and the second allocation of opportunities comprises an allocation of contention-based opportunities.

21. The apparatus of claim 19, wherein the UID is based on the opportunity of the second allocation of opportunities, which is used for the short feedback.

22. The apparatus of claim 19, wherein the short feedback trigger frame, the short feedback, the MU trigger frame, and the uplink transmission are within a same Transmit Opportunity (TxOP).

23. The apparatus of claim 19 comprising a radio, one or more antennas, a memory and a processor.

24. A product including one or more tangible computer-readable non-transitory storage media comprising computer-executable instructions operable to, when executed by at least one processor, enable the at least one processor to cause a first wireless station to:
  process a short feedback trigger frame from a second wireless station, the short feedback trigger frame comprising a polling type indication to indicate polling for a Multi-User (MU) positioning measurement, the short feedback trigger frame comprising a first allocation of opportunities for short feedback from associated stations, and a second allocation of opportunities for short feedback from unassociated stations;
  transmit a short feedback at an opportunity of the first allocation of opportunities, when the first wireless station is associated with the second wireless station, or at an opportunity of the second allocation of opportunities, when the first wireless station is unassociated with the second wireless station, the short feedback to indicate an uplink resource request for the MU positioning measurement;
  process a MU trigger frame from the second wireless station to allocate uplink resources to a plurality of stations comprising the first wireless station, the MU trigger frame comprises an unassociated identifier (UID) to identify the first wireless station when the first wireless station is unassociated with the second wireless station; and
  transmit an uplink transmission comprising a positioning measurement request to the second wireless station according to the uplink resources allocated by the MU trigger frame.

25. The product of claim 24, wherein the short feedback trigger frame, the short feedback, the MU trigger frame, and the uplink transmission are within a same Transmit Opportunity (TxOP).

* * * * *

UNITED STATES PATENT AND TRADEMARK OFFICE
CERTIFICATE OF CORRECTION

PATENT NO. : 10,374,778 B2
APPLICATION NO. : 15/393329
DATED : August 6, 2019
INVENTOR(S) : Jonathan Segev et al.

It is certified that error appears in the above-identified patent and that said Letters Patent is hereby corrected as shown below:

In the Claims

In Column 50, Line 8, in Claim 1, delete "comprising circuitry and" and insert -- comprising hardware circuitry, and --, therefor.

In Column 51, Line 54, in Claim 19, delete "comprising circuitry and" and insert -- comprising hardware circuitry, and --, therefor.

Signed and Sealed this
Tenth Day of December, 2019

Andrei Iancu
*Director of the United States Patent and Trademark Office*